United States Patent
Myers et al.

(10) Patent No.: US 7,495,193 B2
(45) Date of Patent: Feb. 24, 2009

(54) PIPE SEAM TACK WELDING METHODS AND APPARATUS USING MODIFIED SERIES ARC WELDING

(75) Inventors: Russ K. Myers, Hudson, OH (US); Timothy M. O'Donnell, Chesterland, OH (US); Timothy P. Rosiek, Mentor, OH (US)

(73) Assignee: Lincoln Global, Inc., City of Industry, CA (US)

(*) Notice: Subject to any disclaimer, the term of this patent is extended or adjusted under 35 U.S.C. 154(b) by 813 days.

(21) Appl. No.: 11/081,059

(22) Filed: Mar. 15, 2005

(65) Prior Publication Data
US 2006/0207983 A1 Sep. 21, 2006

(51) Int. Cl.
*B23K 9/10* (2006.01)

(52) U.S. Cl. .......................... 219/130.51; 219/130.51; 219/137 R; 219/137 PS; 219/54; 219/60.2; 219/61; 219/60 A

(58) Field of Classification Search ................... 219/54, 219/60.2, 61, 60 A, 130.51, 137 R, 137 PS, 219/76.13, 76.14
See application file for complete search history.

(56) References Cited

U.S. PATENT DOCUMENTS

| | | | |
|---|---|---|---|
| 2,669,640 A | 2/1954 | Outcalt et al. | |
| 2,938,107 A | * | 5/1960 | Pease .................... 219/137.71 |
| 3,223,818 A | * | 12/1965 | Chyle ......................... 219/73 |
| 3,456,089 A | * | 7/1969 | Shrubsall ..................... 219/73 |
| 3,517,156 A | * | 6/1970 | Arnoldy ................... 219/76.14 |
| 4,088,866 A | * | 5/1978 | Lund et al. .............. 219/137 R |
| 4,246,463 A | | 1/1981 | Shutt et al. |
| 4,546,234 A | | 10/1985 | Ogasawara et al. |
| 4,717,807 A | | 1/1988 | Parks et al. |
| 4,954,691 A | | 9/1990 | Parks et al. |
| 4,972,064 A | | 11/1990 | Stava |
| 5,001,326 A | | 3/1991 | Stava |
| 5,003,154 A | | 3/1991 | Parks et al. |
| 5,148,001 A | | 9/1992 | Stava |
| 5,278,390 A | | 1/1994 | Blankenship |
| 5,676,857 A | | 10/1997 | Parker |
| 5,683,602 A | | 11/1997 | Stava |
| 5,715,150 A | | 2/1998 | Stava |
| 5,742,029 A | | 4/1998 | Stava et al. |
| 5,864,116 A | | 1/1999 | Baker |
| 6,025,573 A | | 2/2000 | Stava |
| 6,111,216 A | | 8/2000 | Stava |
| 6,160,241 A | | 12/2000 | Stava et al. |

(Continued)

OTHER PUBLICATIONS

Lincoln Electric, Another Arc Welding Development "The Lincoln One Side System".

(Continued)

*Primary Examiner*—Tu B Hoang
*Assistant Examiner*—Stephen J Ralis
(74) *Attorney, Agent, or Firm*—Fay Sharpe LLP

(57) ABSTRACT

Welders and methods are presented for short-circuit arc welding a workpiece using a modified series arc welding configuration with two electrodes via a sequence of welding cycles, in which each cycle includes an arc condition a short-circuit condition, wherein one or both electrode currents are selectively reversed during a reverse boost portion of the welding cycle to transfer molten metal from the second electrode to the first electrode prior to a short-circuit condition of a subsequent welding cycle.

62 Claims, 12 Drawing Sheets

U.S. PATENT DOCUMENTS

| | | |
|---|---|---|
| 6,172,333 B1 | 1/2001 | Stava |
| 6,204,478 B1 | 3/2001 | Nicholson et al. |
| 6,207,929 B1 | 3/2001 | Stava et al. |
| 6,215,100 B1 | 4/2001 | Stava |
| 6,274,845 B1 | 8/2001 | Stava et al. |
| 6,291,798 B1 | 9/2001 | Stava |
| 6,365,874 B1 | 4/2002 | Stava |
| 6,472,634 B1 | 10/2002 | Houston et al. |
| 6,489,592 B2 | 12/2002 | Stava et al. |
| 6,501,049 B2 | 12/2002 | Stava |
| 6,570,131 B1 | 5/2003 | Stava |
| 6,600,134 B2 | 7/2003 | Stava |
| 6,660,966 B2 | 12/2003 | Houston et al. |
| 6,849,827 B2 | 2/2005 | Thommes |
| 2003/0006222 A1 | 1/2003 | Houston et al. |
| 2004/0050833 A1 | 3/2004 | Stava et al. |

OTHER PUBLICATIONS

AC-1200, Automatic Submerged Arc Welding Power Source, Lincoln Electric.

* cited by examiner

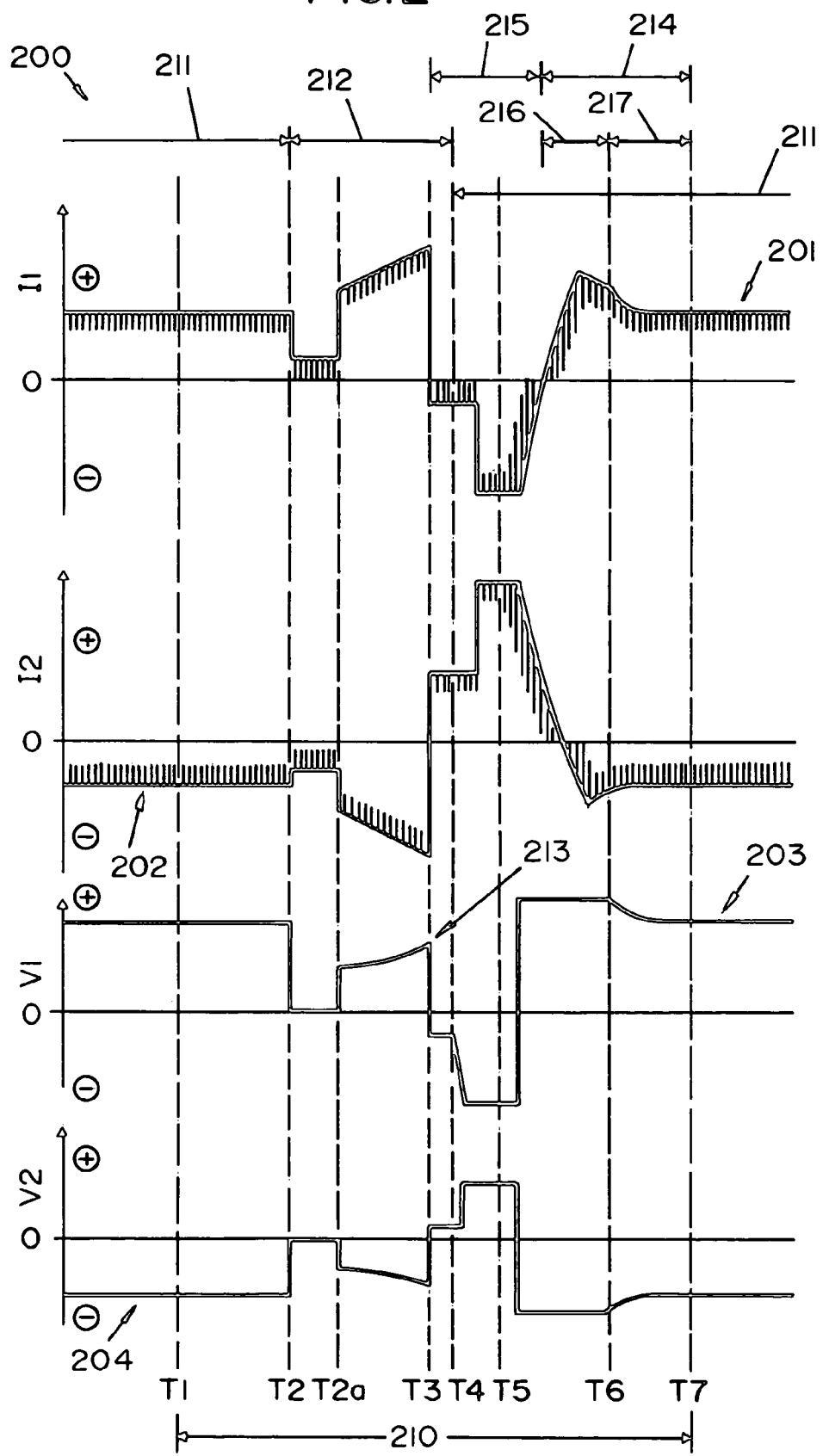

PIPE SEAM TACK WELDING METHODS AND APPARATUS USING MODIFIED SERIES ARC WELDING

FIELD OF THE INVENTION

The present invention relates generally to welding equipment generally, and more particularly to apparatus and methods for improved modified series arc welding for forming tack welds in a pipe welding process.

INCORPORATION BY REFERENCE

Series, tandem, and short-circuit arc welding systems, techniques, and associated concepts are generally set forth in the following United States patents and published applications, the contents of which are hereby incorporated by reference as background information: Shutt U.S. Pat. No. 4,246,463; Ogasawara U.S. Pat. No. 4,546,234; Parks U.S. Pat. No. 4,717,807; Stava U.S. Pat. No. 4,972,064; Stava U.S. Pat. No. 5,001,326; Blankenship U.S. Pat. No. 5,278,390; Parker U.S. Pat. No. 5,676,857; Stava U.S. Pat. No. 5,683,602; Stava U.S. Pat. No. 5,715,150; Stava U.S. Pat. No. 5,742,029; Stava U.S. Pat. No. 6,025,573; Stava U.S. Pat. No. 6,111,216; Stava U.S. Pat. No. 6,160,241; Stava U.S. Pat. No. 6,172,333; Nicholson U.S. Pat. No. 6,204,478; Stava U.S. Pat. No. 6,207,929; Stava U.S. Pat. No. 6,215,100; Stava U.S. Pat. No. 6,274,845; Stava U.S. Pat. No. 6,291,798; Stava U.S. Pat. No. 6,365,874; Houston U.S. Pat. No. 6,472,634; Stava U.S. Pat. No. 6,489,592; Stava U.S. Pat. No. 6,501,049, Stava U.S. Pat. No. 6,570,131; Stava U.S. Pat. No. 6,600,134; Houston U.S. Pat. No. 6,660,966; Houston US2003/0006222A1; and Stava US2004/0050833A1.

BACKGROUND

In the fabrication of large diameter pipes, steel workpiece sheets are rolled and formed into a cylindrical shape, and lateral edges of the rolled sheet are joined to form a longitudinal pipe seam. The seam joint is typically welded to finish the cylinder shape, where the welded seam must be of adequate strength to maintain fluid seal for transfer of fluids or gas within the finished pipe. Prior to engaging the pipe seam edges, the edges are normally ground or milled to create angled or chamfered portions of the edges, where engagement of the seam edges forms inner and outer longitudinal grooves along the seam. In welding the pipe seam, it is initially desirable to tack weld the seam edges to one another to create a joint for holding the seam together. Thereafter, inner and outer welding steps fill the remainder of the seam grooves, wherein the initial tack weld is completely consumed by the subsequent inner and outer groove welds. The initial tack weld ideally can have no holes and must be structurally sound to hold the pipe together until the subsequent welds are completed. In creating the initial tack weld, the welder is preferably translated along the pipe seam at a high speed to provide sufficient molten metal to hold the seam edges together with no gaps and without damaging the edges of the pipe seam.

Pipe milling operations are demanding high lineal welding speeds for the initial seam tack weld, which welding speeds require higher weld deposition rates than can be produced with current seam welding techniques. In particular, pipe fabricators want to be able to tack weld pipe seams at lineal weld speeds as high as 10 meters per minute, whereas conventional pipe tack welding operations can achieve weld rates of only about 3 to 5 meters per minute. In conventional pipe welding, the milled seam edges are initially brought in contact and a tack weld is performed at a voltage of about 25 volts with 600 to 800 amperes current using short-circuit transfer techniques with relatively thick welding wire (e.g., ⅛ or 5/32 inch wire). This is normally done by DC or AC MIG welding to provide high welding speed. However, such high deposition rate processes involve high arc force, in which the arc may tend to drive-through the pipe. Sometimes short circuit arc processes are used for tacking the seam, with process controls adapted to control the arc force and workpiece heating, at the expense of welding rate. Such a process employs a short-circuit arc transfer welding procedure using a wire feed speed that is normally in the spray range, with a voltage well below a normal spray arc voltage so as to cause the short-circuit conditions. One problem associated with the prior short circuit tack weld approach for pipe seams is relatively low amount of metal deposited per unit of time (low deposition rate), wherein the deposition rate is limited by the low heat limitation in order to prevent burn through. In this regard, a large current flows to the workpiece immediately after the short-circuit condition begins, which could potentially blow through the pipe. As a result, the arc voltage and/or current must be kept relatively low to avoid driving the welding arc through the workpiece seam, whereby the deposition rate of the buried arc approach is limited. Thus, conventional MIG arc welding and other prior welding processes are too slow for the demands of pipe welding operations, particularly for the initial pipe seam tack weld, without risking arc drive-through. Consequently, there is a continuing need for improved pipe seam tack welding processes and welding systems to provide high deposition rates and lineal welding speeds with improved seam integrity without undue spatter, arc drive-through, or excessive workpiece heating, for tack welding of longitudinal pipe seams in a pipe mill.

SUMMARY

A summary of one or more aspects of the invention is now presented in order to facilitate a basic understanding thereof. This summary is not an extensive overview of the invention, and is intended neither to identify key or critical elements of the invention, nor to delineate the scope of the invention. The primary purpose of the summary is, rather, to present some concepts of the invention in a simplified form prior to the more detailed description that is presented hereinafter. The present invention relates to improved pipe seam welding techniques as well as a modified series arc welding apparatus and methods, with its advantages, used to perform a short-circuit welding technique. This combination provides two welding electrodes to perform the tack welding process. The invention may be advantageously employed to provide highly repeatable pipe seam welds with easy setup. The seam welding aspects of the invention provide for formation of a tack weld at an outer groove portion of a joint between engaged seam edges, followed by inner and outer groove welds to complete the pipe seam, wherein the tack weld formation may be facilitated by using the modified series approaches and apparatus of the invention.

The modified series arc welding aspects of the invention involve the use of welding cycles having short-circuit and arc phases in combination with series connection of two welding power sources and two welding electrodes, where the welder detects the onset of a molten portion of a welding electrode short-circuiting to a weld pool on the workpiece and anticipates or predicts fuse conditions in which the molten portion separates from the electrode. The welder adjusts the electrode currents and/or voltages according to these detected or predicted conditions so as to provide high quality welds at high deposition rates while controlling arc force and preventing arc drive-through in initial tack welding of pipe seams or in other welding processes. The invention also provides selective electrode current polarity reversal, wherein the current through a first series electrode has a first polarity during an arc condition and at least a portion of a subsequent short-circuit condition, and has a second opposite polarity during a reverse boost portion of the welding cycle. This polarity reversal facilitates transfer of molten metal from the second electrode to the first electrode prior to a short-circuit condition of a subsequent welding cycle in order to expedite formation of another molten metal ball for transfer to the workpiece. The polarity reversal and the use of multiple electrodes thus provides for enhanced deposition rates, while the modified short circuit welding control ensures a controlled amount of arc force for repeatable direction of molten metal to the workpiece without the risk of driving an arc through the pipe workpiece during tack welding of pipe seams.

One aspect of the invention provides a modified series arc welder with first and second wire feeders respectively directing first and second electrodes toward a workpiece, as well as corresponding first and second power sources providing currents to the electrodes. The power sources and the electrodes are coupled in a series circuit, where the power sources provide electrode power in the form of a plurality of the welding cycles for depositing molten metal along a workpiece groove. The first power source provides a first current to the first electrode according to a selected first waveform, and the second power source provides a second current to the second electrode according to a selected second waveform in the welding cycles, where individual welding cycles include an arc condition and a short-circuit condition. In a preferred implementation, the first current has a first polarity during the arc condition and at least a portion of the short-circuit condition, and a second opposite polarity during a reverse boost portion of the welding cycle to thereby transfer molten metal from the second electrode to the first electrode prior to a short-circuit condition of a subsequent welding cycle. In one example, current flows from the first power source to the first electrode when the first current has the first polarity, and current flows from the first electrode to the first output terminal of the first power source when the first current has the second opposite polarity. Current polarity reversal may also be provided for the second electrode during the reverse boost portion of the welding cycle according to the second waveform.

Another aspect of the invention provides a modified series arc welder for depositing weld metal along a groove proximate a pipe seam using a plurality of welding cycles individually having a short-circuit condition and an arc condition. The modified series welder comprises a pair of wire feeders to direct first and second electrodes toward a point proximate the workpiece, a first power source providing a first current to the first electrode, and a second power source providing a second current to the second electrode, where the electrodes are connected in a series circuit. The welder may further include a short-circuit detection circuit, such as a comparator, for detecting the beginning of the short-circuit condition, as well as a premonition circuit to detect an imminent fuse condition in a welding cycle. Moreover, one or both of the power supplies can be adapted to selectively reverse an electrical polarity of the corresponding electrode current during the welding cycles.

Still another aspect of the invention provides an arc welding system, which includes a wire feeding system and a source of electrical power. The wire feeding system directs first and second series connected electrodes toward a workpiece, and the power source provides a first current to the first electrode and a second current to the second electrode to deposit electrode material in a short-circuit arc welding process having an arc condition and a short-circuit condition in each of a plurality of welding cycles. The system may also provide selective electrode current polarity reversal, with the currents being controlled according to detected short-circuit and metal breaking fuse conditions in the weld process, along with selective power boost pulse application during the arc condition to form molten material on the first electrode for transfer during a subsequent short-circuit condition.

In accordance with yet another aspect of the invention, an arc welding system is provided, which comprises a wire feeding system adapted to direct first and second electrodes toward a point proximate a workpiece, and a source of electrical power energizing the electrodes to deposit electrode material in a short-circuit arc welding process having an arc condition and a short-circuit condition in each of a plurality of welding cycles. In this aspect of the invention, the electrical power source provides a first current to the first electrode and a second current to the second electrode to establish a first arc between the first electrode and the workpiece and a second arc between the first and second electrodes, wherein phase reversal and other electrode current control techniques may be employed to facilitate high deposition rates along with control of arc force and workpiece heating.

A further aspect of the invention provides a method for welding a workpiece. The method comprises directing first and second electrodes toward a workpiece, and providing first and second currents to the electrodes to establish a first arc between the first electrode and the workpiece and a second arc between the first and second electrodes in order to transfer material from the electrodes to the workpiece in a plurality of welding cycles, where each welding cycle includes an arc condition and a short-circuit condition.

Still another aspect of the invention relates to a short-circuit welding method, comprising directing first and second electrodes toward a workpiece, and providing first and second currents to the electrodes according to selected waveforms to deposit molten metal from one or both electrodes onto the workpiece in a sequence of welding cycles. Each welding cycle includes an arc condition, a short-circuit condition, a fuse condition, and an arc initiation condition. The method comprises selectively reversing the polarity of the first current during the welding cycle such that the first current has a first polarity during the arc condition and at least a portion of the short-circuit condition, and a second opposite polarity during a reverse boost portion of the welding to transfer molten metal from the second electrode to the first electrode prior to a short-circuit condition of a subsequent welding cycle. The method may further comprise selectively reversing the polarity of the second current during the welding cycle such that the second current has a first polarity during the arc condition and at least a portion of the short-circuit condition, and a second opposite polarity during the reverse boost portion of the welding cycle according to the second waveform.

In yet another aspect of the invention, a method is provided for welding a pipe seam. The method comprises engaging two pipe seam edges to one another to form a cylindrical pipe structure having an inside and an outside, as well as a seam at the two engaged seam edges with an outer groove and an inner groove. The method provides for welding a portion of the outer groove using a high current series welding process to tack the two seam edges together, where the series welding process comprises a plurality of welding cycles individually having a short-circuit condition and an arc condition. The method further comprises welding the inner groove after the two seam edges have been tacked together to essentially fill the inner groove and form an inner seam, and welding the outer groove after welding the inner groove to essentially fill the outer groove and form an outer seam. The method may further include grinding the outer seam.

BRIEF DESCRIPTION OF THE DRAWINGS

The following description and drawings set forth in detail certain illustrative implementations of the invention. These are indicative of only a few of the various ways in which the principles of the invention may be employed. Other objects, advantages and novel features of the invention will become apparent from the following detailed description of the invention when considered in conjunction with the drawings, in which:

FIG. 2 is a plot illustrating exemplary first and second current waveforms and corresponding first and second voltage waveforms during a welding cycle in the welder of FIGS. 1A-1C, in which the electrode current polarities are reversed in a reverse boost portion of the welding cycle to transfer molten metal from the second electrode to the first electrode prior to a short-circuit condition of a subsequent welding cycle in accordance with the invention;

DETAILED DESCRIPTION OF THE INVENTION

Figure 1A:
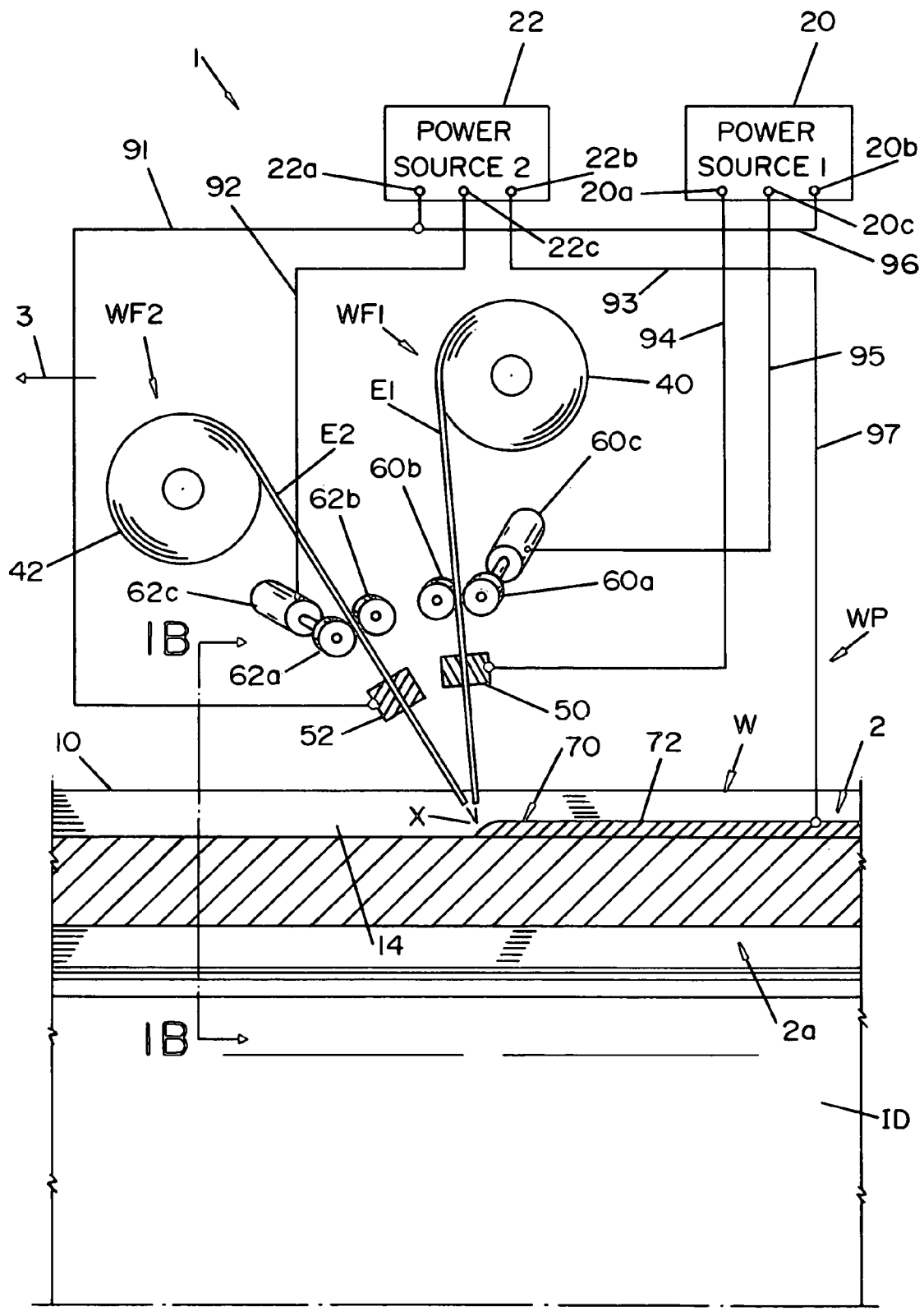
FIG. 1A is a partial side elevation view in section illustrating an exemplary modified series electric arc welder with first and second wire feeders driving corresponding first and second electrodes, as well as first and second power sources to form an initial tack weld in the fabrication of a pipe seam in accordance with one or more aspects of the present invention.

One or more implementations of the present invention will now be described with reference to the drawings, wherein like reference numerals are used to refer to like elements throughout and wherein the illustrated structures are not necessarily drawn to scale. The various aspects of the invention may be employed to facilitate improved deposition rates for expedited formation of the initial pipe seam tack welds, while providing control of weld penetration, spatter, arc drive-through, welding cycle energy transfer, and/or control of workpiece heating, as illustrated and described hereinafter. In one aspect, the invention provides modified series arc welding with multiple electrodes connected in a series circuit to enhance deposition of electrode material, together with short circuit welding apparatus and techniques to control arc blow through, whereby the invention finds particular utility in association with tack welding longitudinal pipe seams. In another inventive approach, a modified short circuit arc welding technique is provided using two electrodes, in which two arcs are generated, with weld material being provided by both electrodes to a workpiece. The use of multiple consumable electrodes provides deposition of higher amounts of metal, wherein the short circuit and multiple arc techniques facilitate controlled arc force and lower heat input into the workpiece. In the modified series welder aspects of the invention, the series connection of two electrodes and/or the provision of two arcs diverts some of the current from the second electrode to the workpiece ground current to provide a controlled amount of arc force, which helps propel the molten metal into the pipe seam. In addition, the multiple arc and polarity reversal aspects of the invention facilitate transfer of molten metal from the second electrode to the first electrode to expedite formation of another molten metal ball for transfer to the workpiece weld pool.

Referring initially to FIGS. 1A-1C, and FIG 4, the invention is hereinafter illustrated and described in the context of a modified series arc welder 1 illustrated performing a first tack weld in fabrication of a steel pipe. A new method 300 for pipe seam welding is illustrated which includes the series modified tack welding as an initial weld step. However, it will be appreciated that the pipe seam welding methods and the series welding aspects of the invention may be carried out separately or in combination, wherein all such alternative implementations are contemplated as within the scope of the invention and the appended claims. The exemplary modified series arc welder 1 of FIGS. 1A-1C employs modified series arc welding technology in which multiple arcs are provided, in combination with short-circuit welding techniques, using two welding wires or electrodes E1 and E2 with selective electrode current reversal for welding a pipe seam, although the concepts of the invention are applicable to arc welding systems and applications generally, and the invention is not limited to the illustrated embodiments.

Figure 1B:
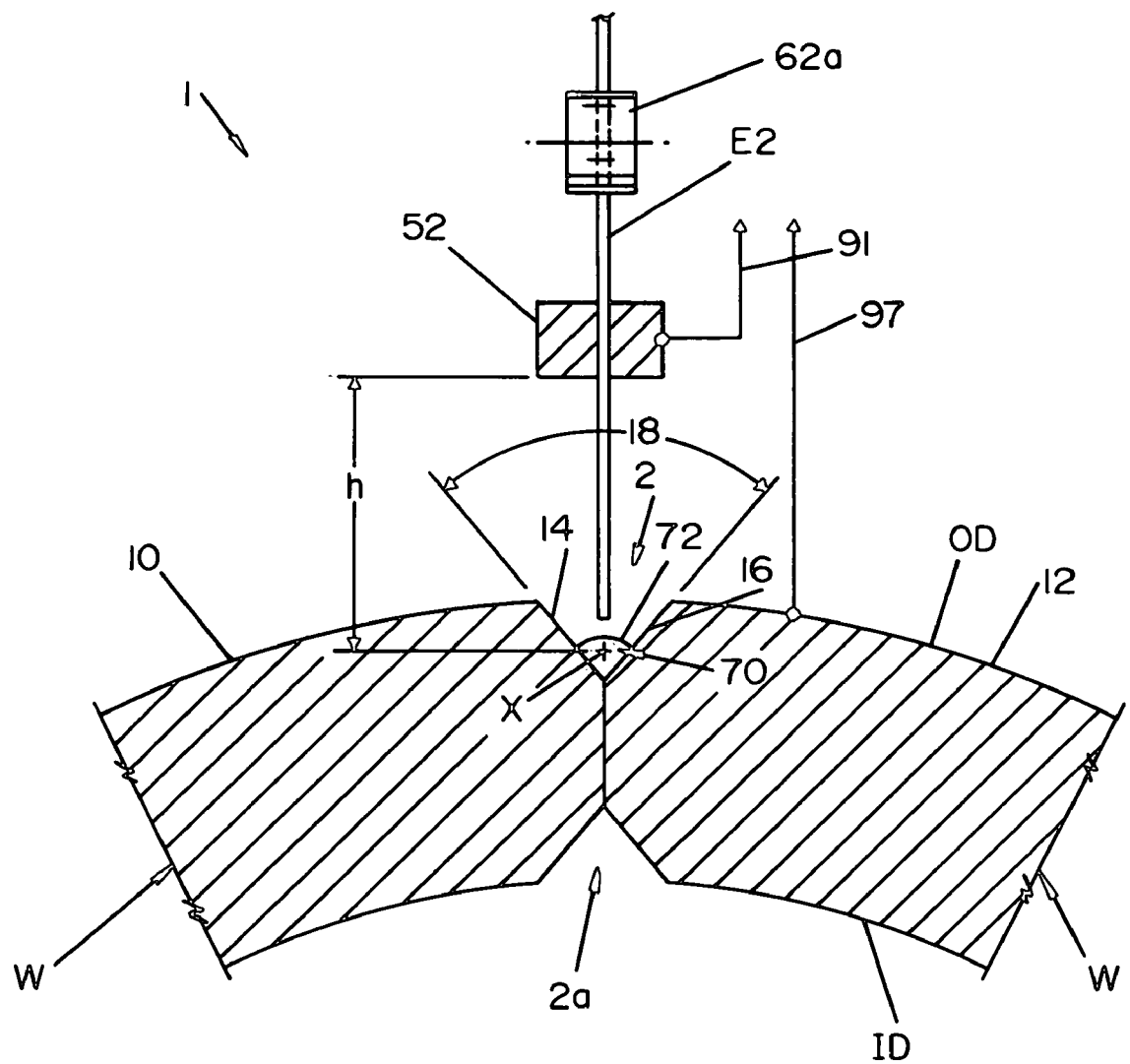
FIG. 1B is a partial end elevation view in section taken along line 1B-1B in FIG. 1A further illustrating the exemplary modified series electric arc welder of FIG. 1A.

As shown in FIGS. 1A and 1B, the welder 1 is operable to deposit or provide molten weld metal 70 along an outer groove 2 between two chamfered edges 14 and 16 of a metal pipe workpiece W from a single side (the outside) of the pipe workpiece W. Prior to the weld operation of FIGS. 1A-1C, the steel workpiece W has been rolled and formed into a generally cylindrical pipe shape (also shown in FIG. 6 below), and the opposite lateral edges 10 and 12 thereof have been milled or ground to provide chamfered longitudinal surfaces, including outer chamfered surfaces or edges 14 and 16. The lateral edges 10 and 12 have been engaged as shown in FIG. 1B (e.g., as well as in FIGS. 5-9 below) such that the chamfered edge surfaces 14 and 16 form an outer groove 2, and the inner chamfered edges surfaces similarly form an inner groove 2a along the longitudinal seam of pipe W. With the edges thus engaged or joined, welder 1 is illustrated in FIGS. 1A and 1B during formation of an initial tack weld or first bead 72 to join the two laterally opposite edges 10 and 12 of the rolled pipe workpiece W prior to subsequent inner and outer groove welds to fill the grooves 2a and 2, respectively (e.g., as illustrated and described further below with respect to FIGS. 7 and 8).

The modified series arc welder 1 comprises a wire feeding system for directing first and second electrodes E1 and E2 toward workpiece W (e.g., toward a point X proximate workpiece W). In the illustrated implementation, the wire feeding system comprises a first wire feeder WF1 (FIG. 1A) which directs the first welding electrode E1 toward point X, as well as a second wire feeder WF2 for directing the second electrode E2 toward the point X. Other implementations are possible within the scope of the invention wherein a single machine feeds both wires or electrodes E1 and E2 toward the pipe W, or where multiple wire feeding devices or machines are used.

The welding systems of the invention also comprise a source of electrical power for energizing electrodes E1 and E2 with corresponding currents I1 and I2. In the illustrated welder 1, electrodes E1 and E2 are connected with power sources 20 and 22 in a modified series circuit which differs from conventional series welders in that the electrodes E1 and E2 are energized using two separate power sources 20 and 22. Alternatively, however, a single power source can be used, having suitable controllable outputs for providing the first and second currents I1 and I2 to the first and second electrodes E1 and E2, respectively, by which first and second arcs A1 and A2 are selectively established during all or portions of each welding cycle. Regardless of the interconnection (if any) of the electrodes E1 and E2, moreover, the invention contemplates welding systems and methods in which two arcs are provided, with a first arc A1 between electrode E1 and workpiece W, and a second arc A2 between electrodes E1 and E2. In this regard, any suitable system power component(s) and interconnections thereof may be employed to provide such multiple arc operation, wherein electrodes E1 and E2 may be series connected as in the exemplary welding system 1, although this is not a strict requirement of the invention.

In addition, the exemplary power sources 20 and 22 employ modified short-circuit welding techniques in which a plurality of relatively low frequency welding cycles are implemented, each cycle including an arc condition and a short-circuit condition in which electrode material contacts the workpiece W or a weld pool thereof 70. In the exemplary welder 1, electrodes E1 and E2 are energized according to a detected short-circuit (start of the short-circuit condition) and according to a detected or anticipated metal breaking fuse condition (predicted end of the short-circuit condition) during each welding cycle, and a power boost pulse is provided during the arc condition to form a metal ball 80 or other molten metal portion awaiting transfer to the workpiece W or the weld pool 70 in the subsequent short-circuit condition.

Furthermore, the exemplary welder 1 and power sources 20, 22 thereof provide for selective electrode current polarity reversal, as illustrated and described in greater detail below with respect to FIG. 2. The modified series welding aspects of the invention may be carried out using just the first and second electrodes E1 and E2, or may alternatively be employed in association with so-called tandem welding systems in which one or more subsequent electrodes (not shown) are driven in unison with electrodes E1 and E2 to perform a tandem welding process, with electrodes E1 and E2 being connected in a series circuit or otherwise energized to form first and second arcs during welding. As shown in FIGS. 1A and 1B, welder 1 is used to deposit electrode material in outer groove 2 of the longitudinal pipe seam of workpiece W in order to form an initial tack weld bead (tack weld) 70, 72 in joining edges 10 and 12 of workpiece W as the electrodes E1, E2 and wire feeders WF1, WF2 are moved in a longitudinal direction 3 generally parallel with outer groove 2. In the illustrated embodiment, the chamfered or tapered edges 14 and 16 define outer groove 2 having an angle 18, as best illustrated in FIG. 1B. Electrodes E1 and E2 are arranged so as to be directed toward a point X in or otherwise proximate to groove 2 of workpiece W so as to create tack weld 70, 72 to hold workpiece edges 10 and 12 together during subsequent fabrication welding. Tapered edges 14 and 16 may be shaped as desired and as is conventional in the welding art, but in the illustrated example are beveled at an angle 18 so as to diverge in an upward direction, where the angle 18 is approximately 45 degrees in one implementation, although not a requirement of the invention.

Wire feeders WF1 and WF2 (best illustrated in FIG. 1A) may be of any conventional or modified construction, wherein the exemplary first wire feeder WF1 includes a motor 60c which drives a pair of pinch rolls 60a and 60b which advance first welding electrode E1 from a supply reel or spool 40 past a first electrical contact 50 coupled with power source 20, after which first electrode E1 is directed toward point X proximate outer seam groove 2, wherein the path of the advancing electrode E1 may be at any angle relative to the horizont81 workpiece surface within the scope of the invention. Second wire feeder WF2 includes a second motor 62c driving a pair of pinch rolls 62a and 62b in order to direct electrode E2 from a supply reel 42 past a second contact 52 and wire feeder WF2 directs second electrode E2 generally toward groove 2 on a path that essentially intersects with the line of movement of electrode E1 at point X. Wire feeders WF1 and WF2 are controlled to direct the corresponding electrodes E1 and E2 at first and second wire feed speeds (e.g., linear rates of translation) generally toward the point X and workpiece W according to signals from first and second power sources 20 and 22, respectively, wherein the wire feed speeds may, but need not, be the same, and wherein the respective wire speeds may be controlled in accordance with selected first and second waveforms in concert with various electrode voltage and/or current waveforms in a welding process comprising a plurality of welding cycles, as illustrated and described further below. Point X is proximate workpiece W a distance h below electrical contacts 50 and 52 (FIG. 1B), and generally indicates the intersection of the translational paths of electrodes E1 and E2, although one or both the electrodes may melt prior to reaching point X.

As illustrated in FIG. 1A, electrodes E1, E2 and power sources 20, 22 are connected in a series circuit for enhanced deposition of molten weld material 70 to tack weld the edges of pipe workpiece W together in outer groove 2. First power source 20 is coupled with first wire feeder WF1 and with first electrode E1 in order to both energize first electrode E1 and also to control the wire feed speed of first wire feeder WF1 (e.g., to control the speed of first motor 60c) during a welding operation. First power source 20 has a first (e.g. positive) output terminal 20a coupled with first electrode E1 via a cable 94 and contact 50, so as to provide electrical power to electrode E1 as a first current I1 according to a first waveform. Power source 20 also includes a second (e.g., negative) output terminal 20b coupled to a first terminal 22a of second power source 22 and to second contact 52 of second wire feeder WF2 via a cable 96, wherein workpiece W itself is typically grounded using standard grounding clamps or other means during a welding operation. In general, first power source 20 provides controlled voltages V1 at first terminal 20a to provide a controllable first current I1 to first electrode E1, wherein first current I1 flows partially in a first circuit from electrode E1 to workpiece W through a first arc A1 and returning through second power source 22 and cable 96, and also partially through a second circuit from first electrode E1 to second electrode E2 and returning via cables 91 and 96, whereby a second arc A2 is established between first and second electrodes E1 and E2. As illustrated and described further below with respect to FIGS. 1C and 2, first power source 20 is operative in a welding cycle 210 to provide first current I1 to first electrode E1 according to a selected first waveform 201, including current polarity reversal in a reverse boost portion 215 of cycle 210 to transfer molten metal 82 from second electrode E2 to first electrode E1 (FIGS. 3C-3F below) prior to a short-circuit condition of a subsequent welding cycle.

First power source 20 further comprises a third output terminal 20c coupled with first wire feeder WF1 to provide a voltage or other control signal to wire feeder motor 60c via a cable 95, to thereby control the rate of translation of first electrode E1 toward workpiece W. This wire feed speed control signal may be generally proportional to first current I1 or first voltage V1 provided to first electrode E1, or may be independently derived or combinations thereof. For instance, the wire feed speed signal at third output terminal 20c may be generally proportional to first electrode current I1 except for portions of the weld cycle in which current I1 is reversed (e.g., electrode E1 will generally not be retracted toward first supply reel 40 even when the polarity of first current I1 is reversed in reverse boost portion 215 of cycles 210). In another possible implementation, the control of the first wire feed speed may be totally independent of first power source 20 and electrode current I1 and voltage V1 provided thereby. In general, the wire feed speed and the control signal at third terminal 20c of first power source 20, as well as voltage V1 applied at first terminal 20a and first current I1 provided to electrode E1, can be tailored according to any desired weld operation, for example, and may be controlled (in a coordinated manner or individually) in programmatic fashion according to a predefined waveform, and/or may be controlled dynamically according to feedback and/or feed-forward signals within a given welding system, wherein all such implementations are contemplated as falling within the scope of the invention.

Second power source 22 is coupled with second wire feeder WF2 and with workpiece W as shown in FIG. 1A, where the exemplary power sources 20 and 22 are similar in the illustrated welder 1, but may alternatively be of different designs. In this regard, power sources 20 and 22 can be any suitable power source design that provides controllable voltages and/or currents to the corresponding welding electrodes, for example, such as a Power Wave unit sold by The Lincoln Electric Company of Cleveland, Ohio as generally disclosed in Blankenship 5,278,390 incorporated herein by reference. Moreover, as discussed above, a single power source could be used having suitable outputs for providing currents I1 and I2 to electrodes E1 and E2, respectively. Second power source 22 has first, second, and third output terminals 22a, 22b, and 22c, respectively, wherein first output terminal 22a is coupled with second electrode E2 and contact 52 of second wire feeder WF2 via cable 91 to provide electrical power to the electrode E2, and terminal 22a is further connected to second terminal 20b of first power source 20 via cable 96 as discussed above. Second output terminal 22b of second power source 22 is coupled to workpiece W and to ground in this example through cables 93 and 97, and third output terminal 22c is coupled with second wire feeder WF2 to provide a voltage or other control signal to wire feeder motor 62c thereof via a cable 92 for controlling the feed speed of second electrode E2. Second power source 22 is adapted in welding cycle 210 (FIG. 2 below) to provide a second current I2 to second electrode E2 according to a selected second waveform 202, where first and second power sources 20 and 22 provide electrical power to electrodes E1 and E2, respectively, as a plurality of relatively low frequency short-circuit type welding cycles 210 to deposit molten metal in pool 70 along upper workpiece seam groove 2 during a welding operation.

Although second terminal 20b of first power source 20 is illustrated as being coupled to first terminal 22a of second power source 22, terminal 20b may alternatively be coupled directly to workpiece W, for example, through cable 97, with cable 96 omitted, and with the control voltages and currents of power sources 20 and 22 being offset accordingly so as to provide the selective current reversal and multiple arc aspects of the invention as described herein regardless of whether the electrodes E1 and E2 and/or power sources 20 and 22 are connected in series, wherein all such alternative implementations are contemplated as falling within the scope of the present invention and the appended claims. In this regard, the modified series/short-circuit welding techniques and aspects of the invention are applicable in any circuit connection in which an arc is provided between one electrode and the workpiece and another arc is provided between the two electrodes, and all such implementations are contemplated as falling within the scope of the present invention and the appended claims. Moreover, as with first power source 20 and wire feeder WF1 described above, second wire feed speed may be controlled by second power source 22 independent of the voltage V2 and current I2 provided thereby, or the second feed speed (e.g. motor 62c) may be controlled by another system component, wherein the second wire feed speed, second voltage V2 (terminals 22a and 22b), and second current I2 provided to second electrode E2 can be tailored according to any desired weld operation, and may be controlled in a coordinated fashion or individually in a programmatic manner (e.g., according to a predefined second waveform) and/or may be controlled dynamically according to feedback and/or feed-forward signals within welder 1, or by external signals or information from external sources. In the series connected configuration of FIG. 1A, the first current I1 is divided between two paths including the second electrode current (through the second arc A1) and the workpiece W (through first arc A1 to molten weld pool 70) during the arc and short-circuit conditions. Consequently, second power source 22 controls the amount of current flowing to pipe W with the resistance of the return path through power source 22 operating to divide the flow of first current I1 between workpiece W and second electrode E2. In this regard, the application of electrode power by power sources 20 and 22 can be controlled with respect to workpiece heat created by the arcs A1 and/or A2, and/or with respect to controlling penetration by the arc force in the welding process, wherein the modified series arrangement of the welder 1 may be employed to achieve high deposition rates via the electrodes E1 and E2 at low heat and without arc drive-through.

In the illustrated modified series welder 1, first electrode current I1 creates a first arc A1 between first electrode E1 and workpiece W and/or molten pool 70 thereon, and second current I2 (e.g., a portion of I1) provides a second arc A2 between electrodes E1 and E2 during certain portions or conditions of the welding cycle 210, as illustrated further in FIGS. 3A-3G below. In particular, current I2 of second arc A2 flows from first electrode E1 to second electrode E2 during the arc condition and a portion of the short-circuit condition (e.g., FIGS. 3A-C, 3F, and 3G), and current I2 of second arc A2 flows in an opposite direction from second electrode E2 to first electrode E1 during the reverse boost portion of welding cycle 210 (FIGS. 3D and 3E) to transfer molten material 82 from electrode E2 to electrode E1. In operation, electrodes E1 and E2 cooperatively interact to provide a molten metal weld puddle or pool 70 in upper workpiece groove 2 to create a first tack weld 72, the bead of which joins or tacks workpiece edges 10 and 12 together partially filling groove 2 and also possibly melting portions of the inwardly facing edges 14 and 16 thereof, although the tack weld operation will ideally provide little or no penetration. Thereafter, tack weld bead 72 may be enlarged by overlaying a secondary or subsequent bead (not shown), for example by one or more trailing electrodes in a tandem welding system or by making another pass with welder 1 during tack welding. In practice, a shielding gas may also be employed around electrodes E1 and E2 during the welding operation or portions thereof. Following the tack weld, further welds are performed (e.g., FIGS. 7 and 8 below) to fill the remainder of grooves 2 and 2a to complete the pipe seam welding, process.

Figure 1C:
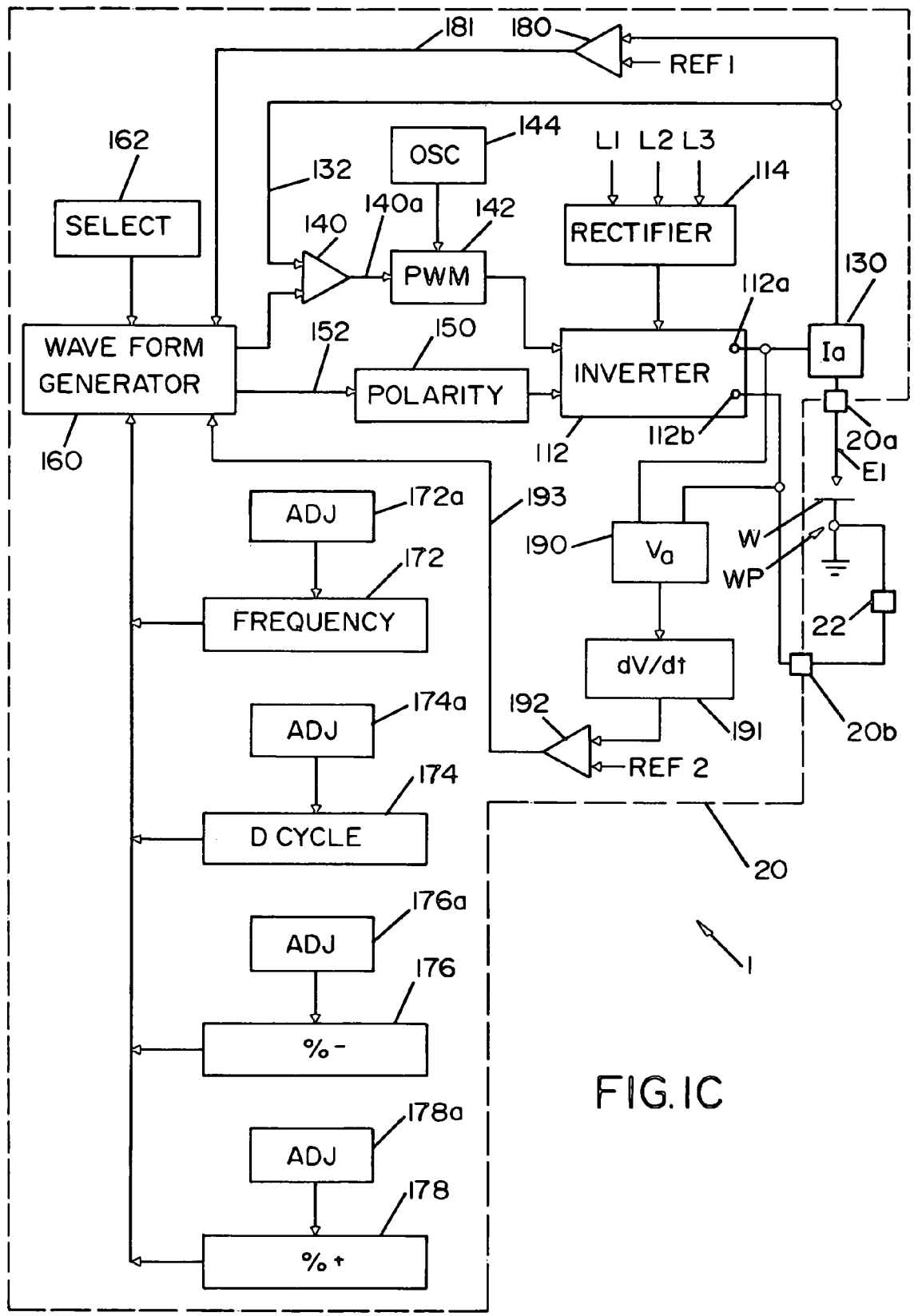
FIG. 1C is a schematic diagram illustrating further details of the exemplary first power source of the electric arc welder of FIGS. 1A and 1B.

Referring also to FIGS. 1C and 2, the exemplary welder 1 employs two substantially identical power sources 20 and 22, wherein the details of first power source 20 are schematically illustrated in FIG. 1C. The exemplary power sources 20 and 22 are digitally controlled and utilize a waveform technology pioneered by The Lincoln Electric Company whereby power sources 20 and 22 create waveforms (e.g., FIG. 2 below) that comprise a series of individual current pulses created at a relatively high switching speed, typically in excess of 18 kHz such as about 40 kHz or higher. In this manner, electrode currents I1 and I2 are provided according to any selected waveform, alone or in combination with inner or outer feedback loops, feed-forward algorithms, etc., in order to optimize the welding process according to desired weld characteristics and/or welder performance characteristics (e.g., including but not limited to the amount of arc force, weld penetration, control of overall workpiece heating, deposition rate, spatter control, preventing arc drive-through, etc.). In this regard, the illustrated voltages and currents are merely examples and other waveforms could be employed to perform the modified multiple arc/multiple electrode short-circuit welding techniques of the invention.

The exemplary first power source 20 is schematically illustrated in FIG. 1C comprising a high speed switching output stage (e.g., a switching inverter) 112 with output terminals 112a and 112b. The output stage 112 creates a first voltage V1 according to a first voltage waveform 203 (FIG. 2) between at first terminal 20a, with output terminal 20b being coupled to second power source 22 in the illustrated welder 1, wherein power source 20 thereby creates first current I1 to first electrode E1 according to a first current waveform 201 to perform an arc welding process at a weld station WP illustrated in FIG. 1C. The inverter 112 is provided with source power in the form of a DC bus (not shown) via a rectifier 114 and operates to selectively couple power from the bus to one or both of the output terminals 112a, 112b according to PWM signals from a pulse-width-modulation circuit 142, although any suitable inverter or other output stage can be employed within the scope of the invention. The exemplary first power source 20 further includes a current shunt 130 coupling inverter terminal 112a with output terminal 20a, where shunt 130 outputs a signal in line 132 reflecting the amplitude of first electrode current I1. Alternatively, a current shunt could be provided in the path of second terminal 20b.

A short-circuit detection circuit is coupled with first output terminal 20a via shunt 130, which operates to detect a beginning of a short-circuit condition 212 (FIG. 2) and to provide a short-circuit signal 181 to a waveform generator 160 in response to the beginning of the short-circuit condition 212. The short-circuit detection circuit comprises a first comparator 180 receiving current signal 132 and a first reference signal REF1, and provides signal 181 to waveform generator 160 when first current signal 132 is greater than first reference signal REF1. Alternative short-circuit detection circuitry or techniques can be employed, for example, which detects a drop in output voltage V1 of power source 20 when output terminals 20a and 20b are shorted (e.g., when molten metal 80 at the end of first electrode E1 contacts molten weld pool 70 on workpiece W, as shown in FIG. 3B below).

The exemplary power source 20 in FIG. 1C further comprises a premonition circuit having an input coupled with first inverter terminal 112a and another input coupled with second output terminal 20b, where the premonition circuit operates to detect an imminent fuse condition 213 (FIG. 2) and to provide a premonition signal 193 to waveform generator 160 in response to imminent fuse condition 213. In the illustrated implementation, the premonition circuit comprises a voltage detector circuit 190 that provide a signal indicating first voltage V1 to a dV/dt circuit 191 that provides a dV/dt signal indicative of a rate of change of first voltage V1. A second comparator 192 compares the signal from circuit 191 to a second reference signal REF2 and provides premonition signal 193 to waveform generator 160 when the dV/dt signal is greater than second reference REF2. Although the short-circuit detection and premonition circuits are schematically illustrated in FIG. 1C as being constructed using comparators 180, 192 and other analog circuit components, other apparatus or systems may be employed to implement the functionality of these circuits, for example, such as programmable or fixed digital circuitry having suitable analog interface components (e.g., A/D converters, etc.), wherein the comparisons, signal generation, etc., may be performed digitally or in software or firmware or combinations thereof.

Waveform generator 160 controls a pulse width modulation circuit 142 to establish first current I1 at inverter output stage 112 according to a selected waveform from a select circuit 162, where selector 162 can be any source of waveform information, including but not limited to a memory containing various predetermined waveforms, a network interface providing access to external sources of waveform data or selection of waveforms stored in welder 1, etc. The output of waveform generator 160 is provided as an input to a comparator 140 along with current feedback signal 132, wherein comparator 140 provides a voltage output signal 140a that controls pulse width modulator circuit 142, where signal 140a can be digital or analog and may have a variety of configurations. The pulse width modulator 142 is driven at high speed by oscillator 144 which, in practice, operates at a frequency of about 40 kHz or more. The oscillator 144 provides a frequency input to PWM circuit 142, which in turn provides switching signals to power switching components (not shown) in inverter 112 so as to create a series of current pulses at a high speed switching rate to provide the desired current and/or voltage waveforms 201, 203 during a welding operation. Furthermore, the polarity of the waveform is controlled by polarity logic 150 according to a signal on line 152 from waveform generator 160 to control the polarity of the waveform that is output by inverter stage 112.

Referring also to FIG. 2, power sources 20 and 22 are operational to provide electrode currents I1 and I2 and corresponding voltages V1 and V2 according to waveforms 201-204 during each cycle 210 of a welding operation, wherein each cycle 210 includes an arc condition and a short-circuit condition, and wherein the welding cycles 210 are repeated at a frequency much lower than that of pulse width modulator 142. First current waveform 201 comprises a series of rapidly created pulses controlled and dictated by waveform generator 160 in accordance with select circuit or network 162 which selects the desired waveform 201, 203 to be created at inverter terminals 112a and 112b. As shown in FIG. 1C, power source 20 may further include waveform adjusting circuits 172-178, each having adjusting networks 172a-178a. For instance, a frequency circuit 172 may be employed to adjust the frequency of waveforms 201, 203 after the desired waveform is selected. Similarly, the duty cycle of the waveform may be controlled by a circuit 174 and corresponding adjust circuit 174a, and circuits 176, 176a and 178, 178a may be provided to control the magnitude of first current I1 during the negative portion of the waveform or the positive portion of the waveform, wherein the adjustment functionality of circuits 172-178 may alternatively be performed digitally in programmable or fixed digital circuits, in software, firmware, etc. Second power source 22 is constructed in similar fashion as first power source 20, wherein the internal details of second power source 22 are similar to those illustrated and described above with respect to FIG. 1C.

Referring now to FIGS. 2 and 3A-3G, FIG. 2 provides a plot 200 illustrating exemplary first and second current waveforms 201 and 202 corresponding to time varying first and second currents I1 and I2 provided by power sources 20 and 22 to first and second electrodes E1 and E2, respectively, as well as corresponding first and second voltage waveforms 203 and 204, respectively. As illustrated in FIG. 2, welder 1 and power sources 20 and 22 thereof are adapted to perform a welding operation to weld plates 10 and 12 of workpiece W using a modified series welding technique that employs short-circuit welding with current polarity reversal. Power sources 20 and 22 energize electrodes E1 and E2 with suitable currents and voltages to implement a welding operation in the form of a plurality or sequence of welding cycles 210 so as to deposit molten metal in the form of a pool 70 along workpiece W (FIG. 1A), wherein each of the welding cycles 210 includes several portions or conditions 211-217.

In particular, the individual welding cycles 210 include an arc condition 211 (FIGS. 2 and 3A) during which first electrode E1 is spaced from pool 70 (e.g., at time T1 in FIG 2), wherein the energy applied to first electrode E1 (e.g., first current I1) causes a first molten metal 80 to form on an end of first electrode E1, typically in the shape of a ball 80. As shown in FIGS. 2, 3B, and 3C, welding cycle 210 also includes a short-circuit condition 212 during which first molten metal 80 initially contacts pool 70 (e.g., at time T2 in FIG. 2) and molten metal 80 begins to transfer from first electrode E1 to pool 70 (time T2a in FIG. 2) by a necking action. It is noted in FIG. 2 that the initial contact of molten metal 80 to weld pool 70 causes a rise in current I1 and a drop in electrode voltages V1 and V2, wherein one or both of power sources 20 and 22 detect this short-circuit condition using current shunt 130, first reference signal REF1, and comparator 180 (FIG. 1C), and wherein waveform generator 160 reduces current I1 (at time T2 in FIG. 2) in response to short-circuit detection signal 181 from comparator 180. In this manner, the power sources 20 and 22 control the electrode power based, at least in part, on a detected short circuit condition 212.

The power sources 20 and 22 then increase the applied electrode currents I1 and I2 (e.g., between times T2a and T3 in FIG. 2), and as the necking action progresses (FIG. 3C), power source 20 monitors the rate of change of first voltage V1 using dV/dt circuit 191 and second comparator 192 of the premonition circuit. As shown in FIG. 3D, the onset of a fuse condition 213 (e.g., separation of molten metal 80 from first electrode E1) is predicted or anticipated (e.g., detected) by a high dV/dt value (rapid rise in first voltage V1) at time T3 in FIG. 2, where power source 20 reverses the polarity of first current I1 and the fuse condition occurs generally at 213 in FIG. 2. Thus, the electrode power is controlled, at least partially, according to a detected end of the short-circuit condition 212. Furthermore, in the dual electrode welder 1, during the necking or pinch action of the short-circuit condition 212, a second molten metal 82 begins to form at the end of second electrode E2, as shown in FIGS. 3C and 3D. During arc condition 211 and at least a portion of short-circuit condition 212, second electrode E2 is biased negative relative to first electrode E1 and workpiece W, wherein second electrode current I2 flows from second arc A2 to electrode E2, thereby dividing current I1 of first electrode E1 between arcs A1 and A2.

In accordance with the present invention, power sources 20 and 22 selectively reverse the polarities of electrode currents I1 and I2 during a reverse boost portion 215 of welding cycle 210. In the illustrated implementation of FIG. 2, first power source 20 provides a positive first current I1 during the arc condition 211 and at least a portion of short-circuit condition 212, and provides a negative first current I1 during reverse boost portion 215 of welding cycle 210 according to first waveform 201 to facilitate transfer of second molten metal 82 from second electrode E2 to first electrode E1 prior to a short-circuit condition of a subsequent welding cycle 210, as illustrated in FIGS. 3D and 3E. After reverse boost portion 215, currents I1 and I2 are returned to their original polarities during an arc initiation condition 214 following fuse condition 213, in which a positive first arc A1 is reestablished or initiated between first electrode E1 and pool 70 for a subsequent welding cycle 210, wherein arc condition 214 includes a positive boost portion 216 following reverse (negative) boost portion 215 (eg. time T6 in FIG. 2, as shown in FIG. 3F), as well as a subsequent tailout portion 217 (e.g., time T7 FIGS. 2 and 3G). In the illustrated welder 1, the boost portion 216 is thus followed by tailout to a controlled background current level during portion 217 to provide controlled overall heating of the arc A1 until the next short-circuit condition 212 in a subsequent cycle 210.

In the illustrated implementation, first current waveform 201 in FIG. 2 includes a positive first current I1 (e.g., first polarity) during arc condition 211 and at least a portion of short-circuit condition 212, and provides a negative first current I1 (e.g., second polarity) during reverse boost portion 215 of welding cycle 210. Thus, first current I1 flows in the direction indicated in FIGS. 3A-3C from first output terminal 20a of first power source 20 (FIG. 1A) to first electrode E1 when first current I1 is of this first polarity (positive), and first current I1 flows from first electrode E1 to first power source output terminal 20a when first current I1 is of the second polarity (negative, as in reverse portion 215 of FIG. 2), wherein first voltage waveform 203 in FIG. 2 represents the corresponding power source voltage V1 at first power source terminal 20a during exemplary welding cycle 210. In the exemplary welding cycle 210, moreover, second current waveform 202 provides second electrode current I2 of generally opposite polarity relative to first current I1, wherein second current I2 is negative (e.g., a first polarity flowing from electrode E2 to second power source 22) during a portion of arc condition 211 and at least a portion of short-circuit condition 212, and then positive (e.g., a second opposite polarity flowing from power source 22 to electrode E2) during reverse boost portion 215 of welding cycle 210, where second voltage waveform 204 represents the corresponding second voltage V2 provided by power source 22 between terminals 22a and 22b thereof during welding cycle 210.

Figure 3A:
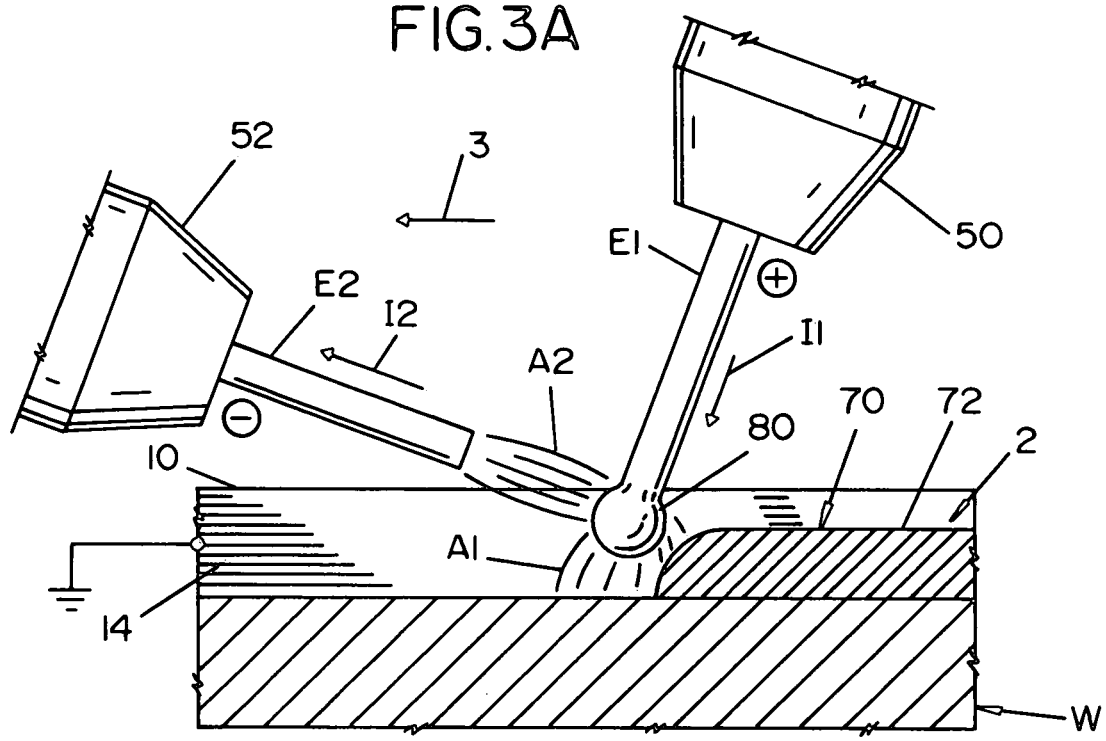
FIGS. 3A-3G are partial side elevation views in section illustrating the first and second electrodes and associated currents, arcs, and molten metal in the welder of FIGS. 1A-1C at various points in a welding cycle of FIG. 2.
Figure 3B:
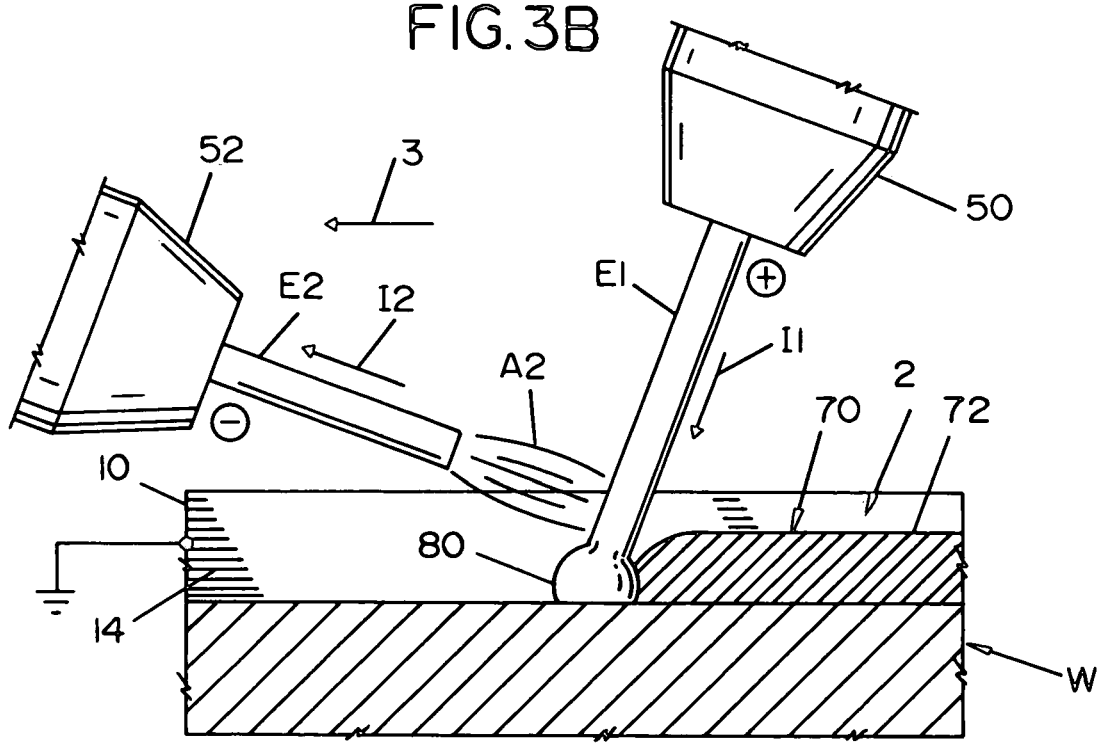
Figure 3C:
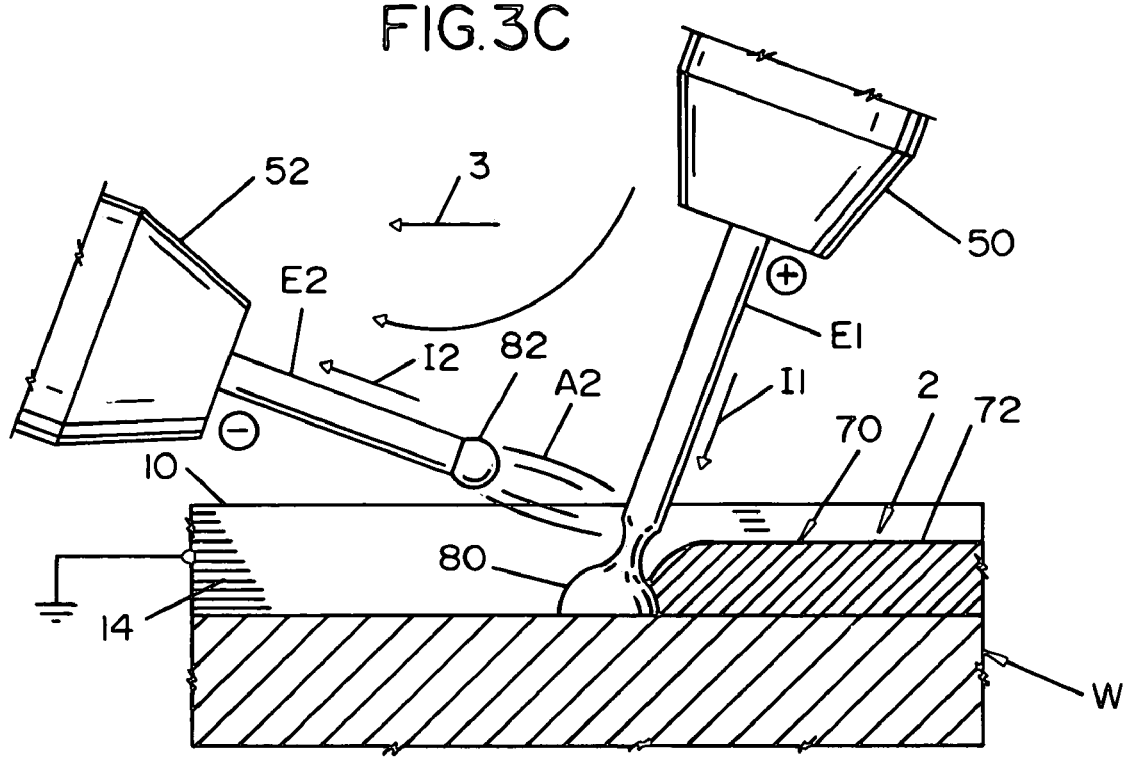
Figure 3D:
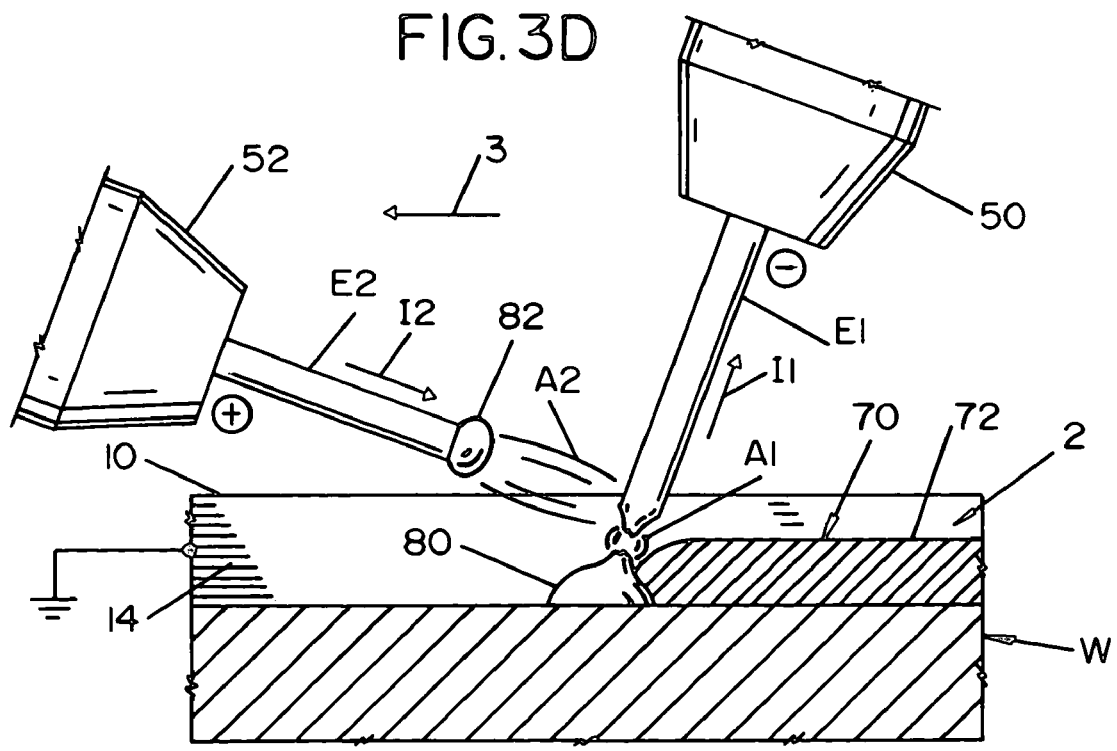
Figure 3E:
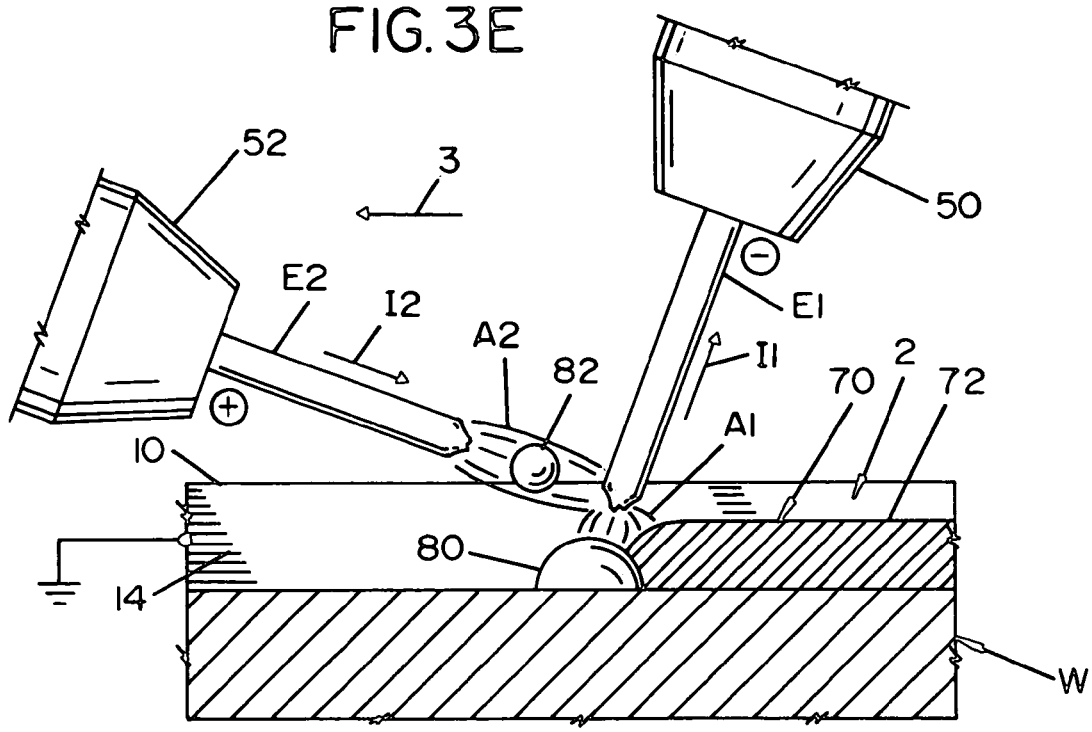
Figure 3F:
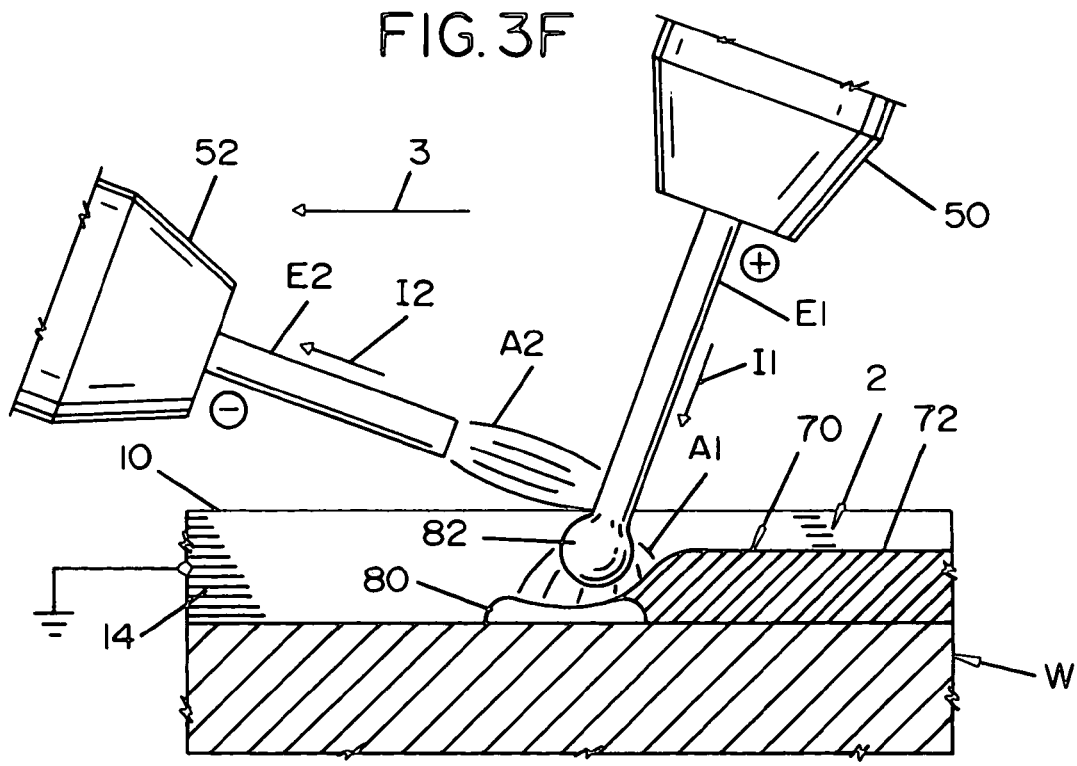

As illustrated in FIGS. 3A-3G, welding cycle 210 proceeds according to the selected first and second current waveforms 201 and 202, where FIG. 3A illustrates a part of the initial arc condition at time T1 in FIG. 2 with first arc A1 formed from first electrode E1 to workpiece W (e.g., to molten weld pool 70 in FIG. 3A), and with second arc A2 flowing from first electrode E1 to second electrode E2, wherein the workpiece current is set or controlled by second power source 22. As shown in FIG. 3A, the entire first current I1 flows through the end of first electrode E1, whereby a ball of molten metal 80 forms on first electrode E1, which is initially spaced from workpiece W. In this initial arc condition 211, first and second currents I1 and I2 are provided at relatively low (e.g., background) levels, with second current I2 being of smaller amplitude than first current I1. In this condition 211, the negative second arc current I2 operates to keep molten first metal 80 away from workpiece W and first arc A1 is positive to allow metal ball 80 to form through heating of the tip or end of electrode E1.

As first electrode E1 continues to be directed toward workpiece W (e.g., by first wire feeder WF1 of FIG. 1A), ball 80 eventually contacts weld pool 70, as shown in FIG. 3B (e.g., at time T2 in FIG. 2), where first power source 20 detects the resulting short-circuit condition 212 by a drop in first voltage V1 or by an increase in first current I1 (e.g., via comparator 180 in FIG. 1C) when first arc A1 and ball 80 short to workpiece pool 70, and accordingly power source 20 reduces current I1. The beginning of short-circuit condition 212 may be concurrently sensed or detected by second power source 22, or the existence of short-circuit condition 212 may be communicated to second power source 22 by first power source 20, where second source 22 reduces the amplitude of second current I2 at time T2, as illustrated in FIG. 2. In one implementation, the low current levels are maintained by power sources 20 and 22 for a short period of time (e.g., a dwell time from time T2 to time T2$a$ in FIG. 2) to allow molten metal 80 to wet into workpiece weld pool 70 while maintaining a minimal amount of potential arc force, wherein second arc A2 is maintained by the flow of second current I2 from first electrode E1 to second electrode E2 during the dwell time, as shown in FIG. 3B.

Referring to FIGS. 2 and 3C, power sources 20 and 22 then provide increase levels of electrode current for the remainder of short-circuit condition 212 (e.g., between times T2$a$ and T3 in FIG. 2), wherein increased current flow from first electrode E1 through molten metal 80 to weld pool 70 begins to pinch off molten ball 80 from first electrode E1. The increased second current I2 concurrently causes melting or burning of second metal 82 at the end of second electrode E2 due to second arc A2, whereupon a second molten ball 82 forms on the end or tip of second electrode E2. At this point, first power source 20 begins monitoring the rate of change of first voltage V1 (e.g. using the dV/dt premonition circuitry of power source 20), so as to anticipate impending separation of first metal ball 80 from first electrode E1 (impending metal breaking fuse condition).

In the illustrated implementation, power sources 20 and 22 reverse the electrical polarities of electrode currents I1 and I2 during an end portion of short-circuit condition 212 (e.g., while waiting for the anticipated metal detachment from electrode E1), whereupon first current I1 goes negative and second current I2 goes positive, where the impedance of second arc A2 can facilitate rapid decrease in first current I1 without stressing switching components of inverter 112 of first power source 20. As shown in FIGS. 3D and 3E, once first molten metal 80 separates (e.g., after fuse condition 213), first arc A1 is reestablished between first electrode E1 and molten pool 70, 80, and first power source 20 applies a reverse boost current I1 with the corresponding first voltage V1 also being negative. The second current I2 is likewise reversed in polarity in reverse boost portion 215 of weld cycle 210, whereby the workpiece current is reversed, so that second molten metal 82 transfers from second electrode E2 to first electrode E1 prior to the next welding cycle 210. This negative or reverse boost portion 215 of welding cycle 210 thus advantageously reduces the workpiece heating, and increases the deposition rate since both electrodes E1 and E2 are contributing molten material 80 and 82 to weld pool 70, and the current reversal in portion 215 expedites the formation of molten material 82, 80 on first electrode E1 for transfer in the next welding cycle 210.

Figure 3G:
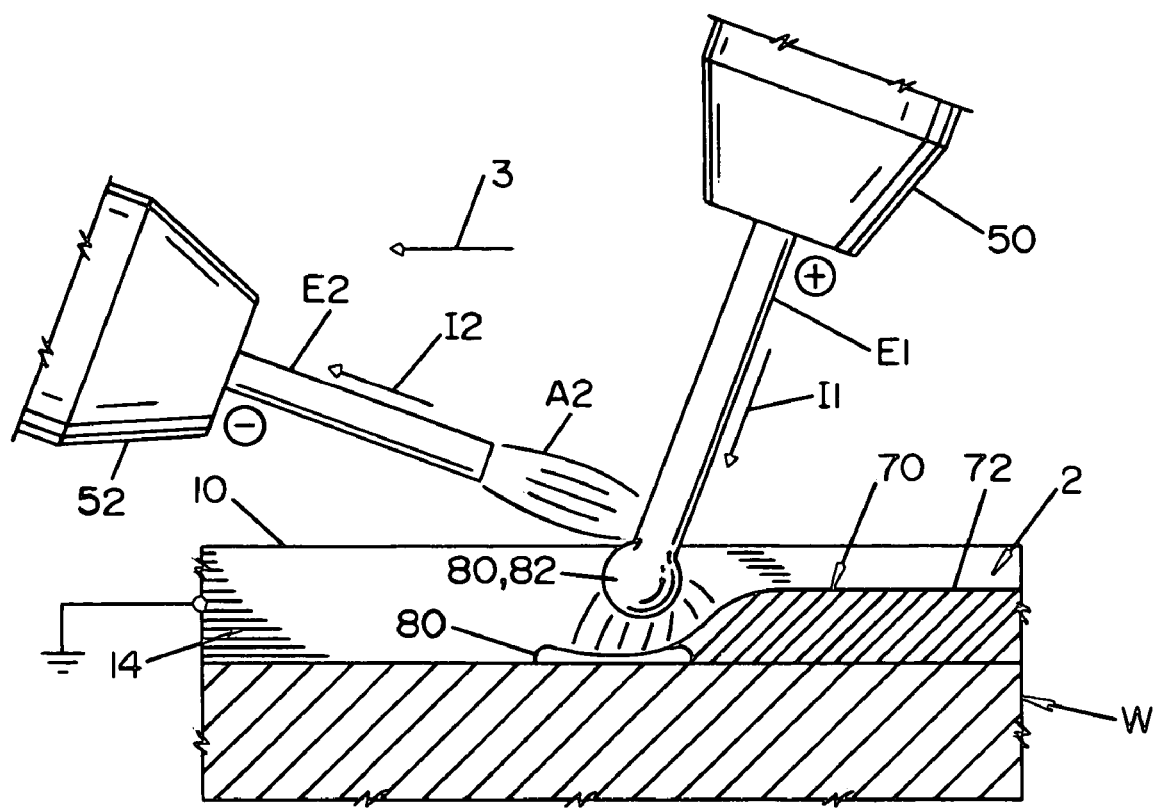

Following reverse boost portion 215, a positive boost 216 is performed, in which a relatively small level of positive boost current I1 (e.g., and corresponding negative current I2) is provided to reestablish arcs A1 and A2 in the original directions (polarities), whereupon second molten material 82 resides on the end of first electrode E1 (FIG. 3F) spaced somewhat from pool 70, first arc A1 provides a portion of first current I1 from first electrode E1 to pool 70, and second arc A2 conducts the remainder of first current I1 (e.g., in the form of second current I2) from first electrode E1 to second electrode E2. At this point (e.g., time T6 in FIG. 2), currents I1 and I2 may be controlled so as to prevent excessive current in second arc A2, to thereby avoid transferring molten material 82 back to second electrode E2. Thereafter, as shown in FIG. 3G, currents I1 and I2 are then slowly ramped back to the background levels in a tailout portion 217 of the cycle, and another weld cycle 210 may begin, wherein the levels of currents I1 and I2 and/or the ramp time in tailout portion 217 may be tailored so as to control the total amount of workpiece heating during positive boost and tailout portions 216 and 217, respectively.

Figure 4:
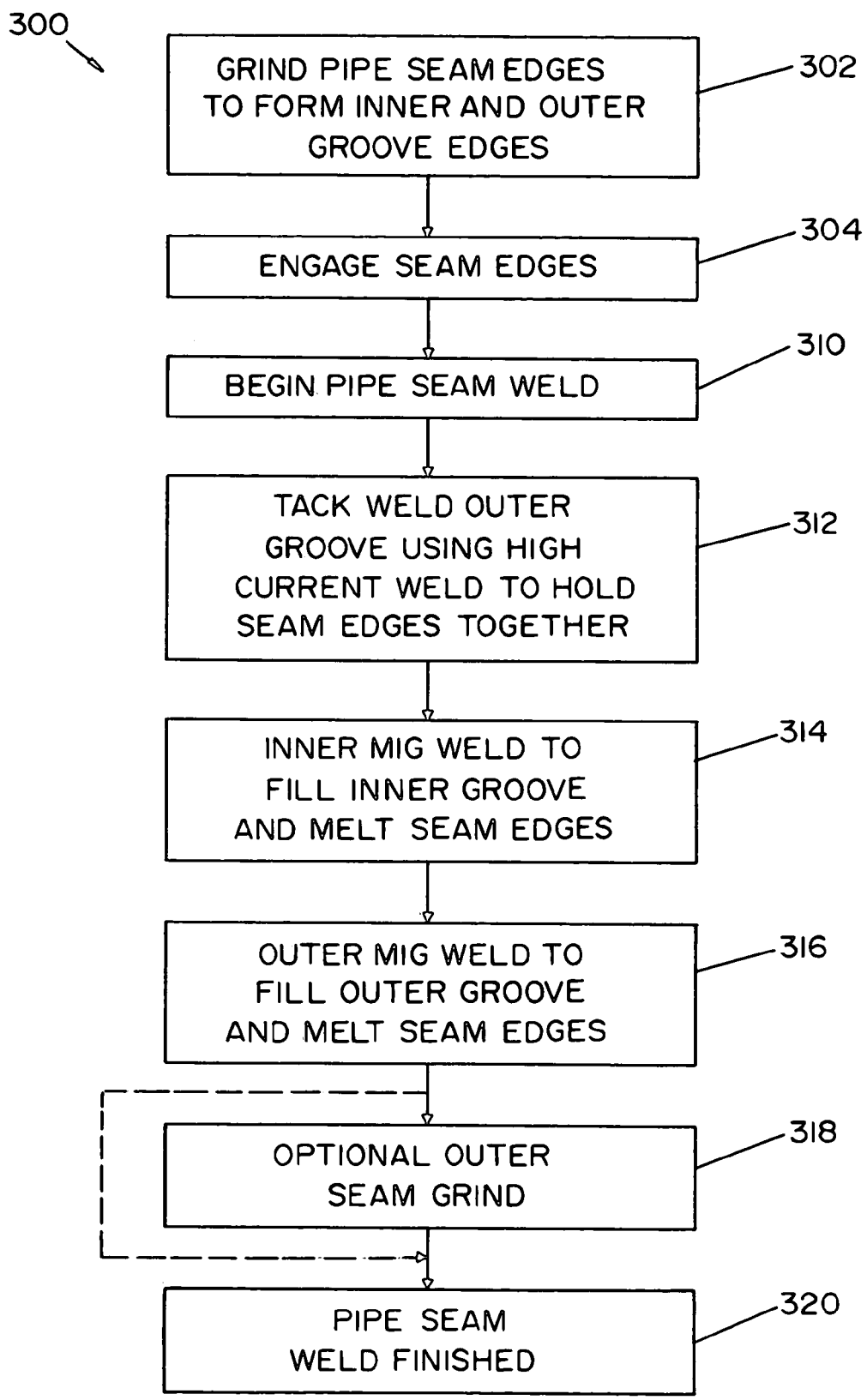
FIG. 4 is a flow diagram illustrating an exemplary method of welding a pipe seam in accordance with another aspect of the invention.
Figure 5:
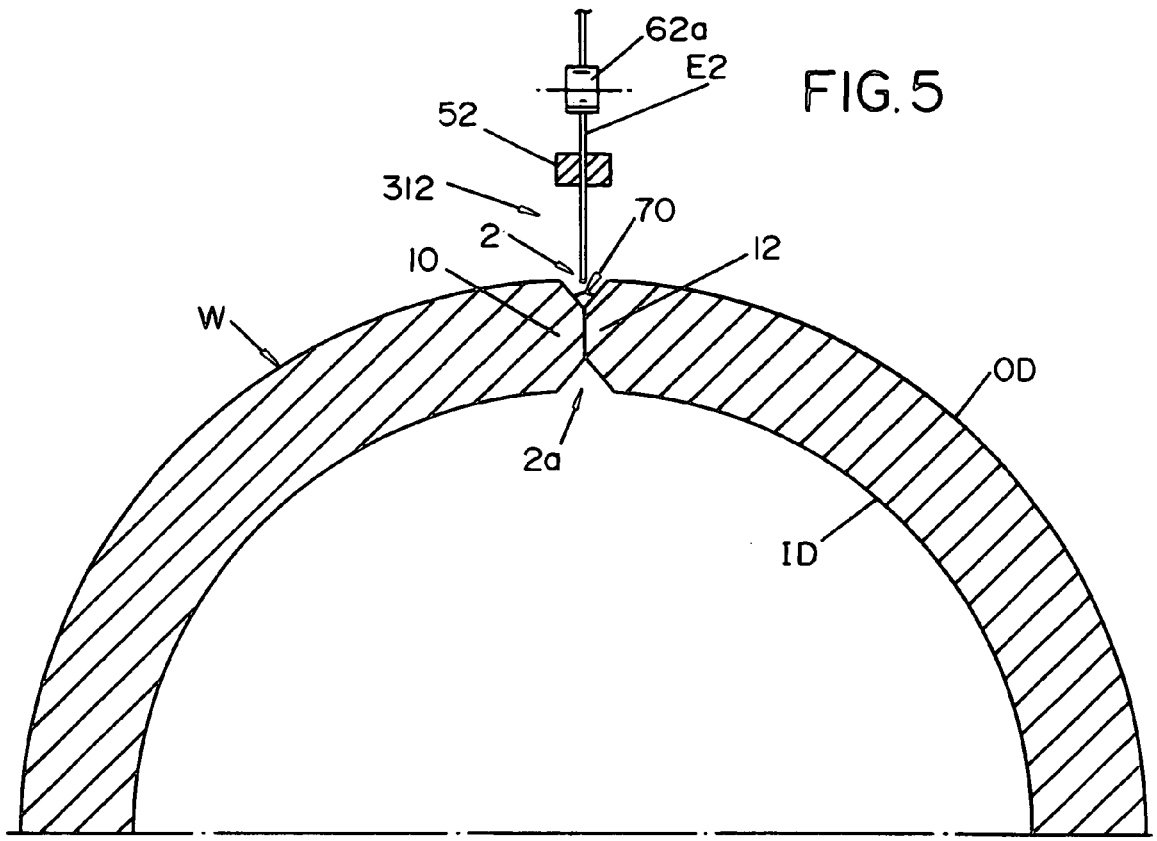
FIG. 5 is a simplified end elevation view in section showing an initial tack welding operation using modified series arc welding in forming a pipe seam in the method of FIG. 4 accordance with the invention.
Figure 6:
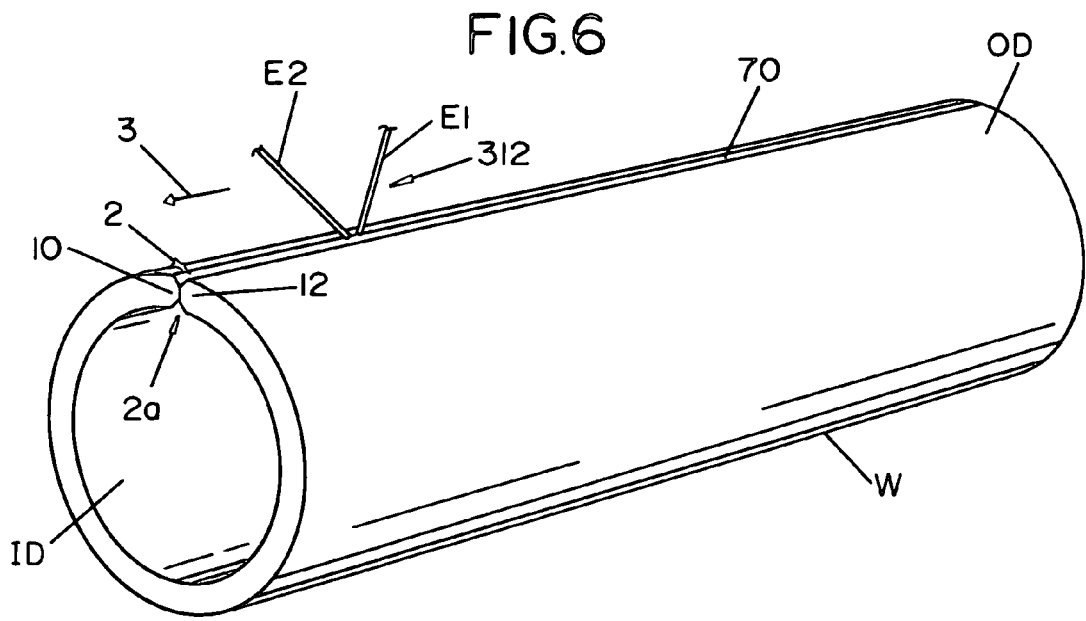
FIG. 6 is a perspective view further illustrating the initial tack welding operation of FIG. 5.

Referring now to FIGS. 4-9, another aspect of the invention provides methods for welding a pipe seam, such as the longitudinal seam of the pipe workpiece W. FIG. 4 illustrates an exemplary method 300 in accordance with the invention. Although the exemplary process or method 300 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. The method 300 begins at 302, where pipe seam edges are ground or milled to form chamfered or beveled inner and outer groove edges (e.g., edges 12 and 14 in FIG. 1B). Thereafter at 304, the two pipe seam edges are joined or engaged to one another to form a cylindrical pipe structure having an inside and an outside. As illustrated in FIGS. 1B, 5, and 6, for example, the exemplary cylindrical pipe structure W has a longitudinal seam at the two engaged seam edges 10, 12 with an outer groove 2 and an inner groove 2$a$.

The pipe seam welding then begins at 310, with an initial tack weld being performed at 312 (FIGS. 1A, 1B, and 5) to weld a portion of the outer groove 2 using a high modified current series welding process to tack the two seam edges 10 and 12 together. As illustrated and described above, the modified series tack welding operation 312 provides a plurality of welding cycles 210 individually having a short-circuit condition and an arc condition to create the tack weld 72 along the outer seam groove 2. In this example, each of the welding cycles 210 includes an arc condition during which first electrode E1 is spaced from the pipe workpiece W and energy applied to the first electrode E1 (e.g., first current I1) causes a first molten metal 80 to form and a short-circuit condition 212 during which the molten metal 80 contacts the workpiece W and then transfers from first electrode E1 to workpiece W by a necking action. In the modified series weld, moreover, the above described current polarity reversal aspects may be advantageously employed during a reverse boost portion of the welding cycle to transfer molten metal from the second electrode to the first electrode prior to a short-circuit condition of a subsequent welding cycle.

Figure 7:
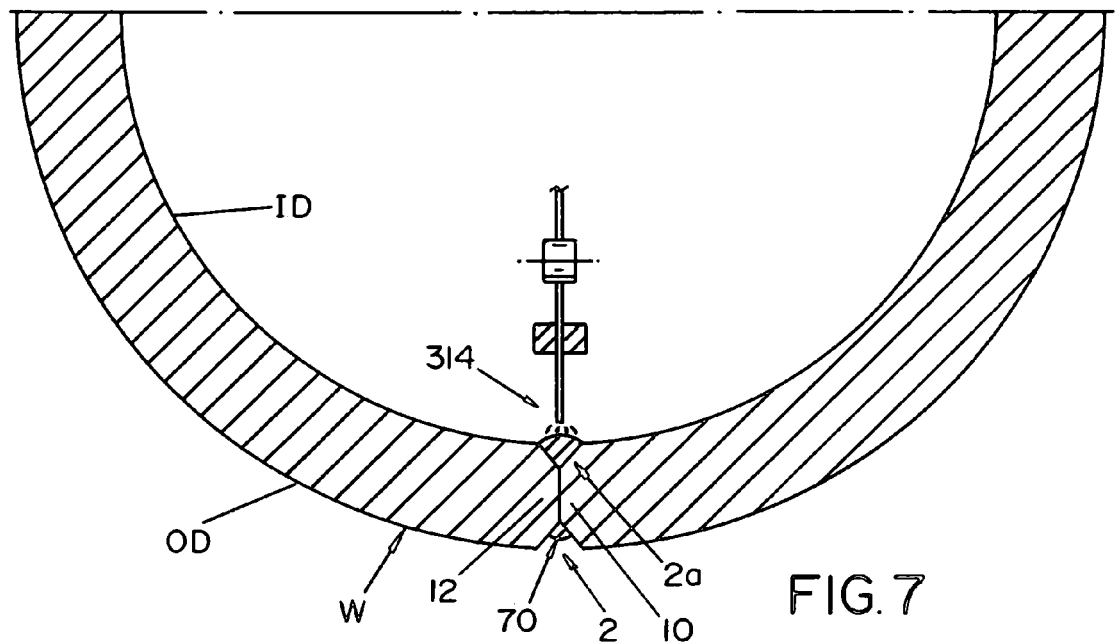
FIG. 7 is a simplified end elevation view in section showing the pipe rotated 180 degrees and an inner groove weld step in the method of FIG. 4.
Figure 8:
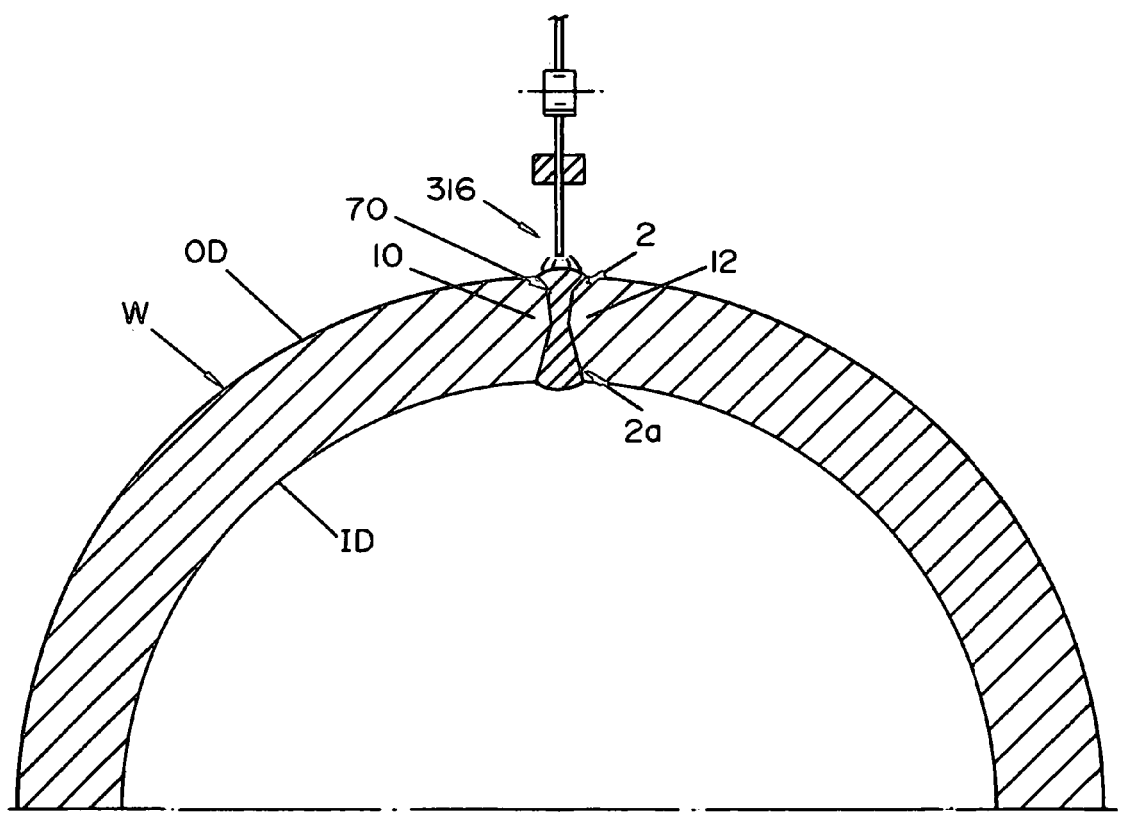
FIG. 8 is a simplified end elevation view in section showing an outer groove weld step in the method of FIG. 4.
Figure 9:
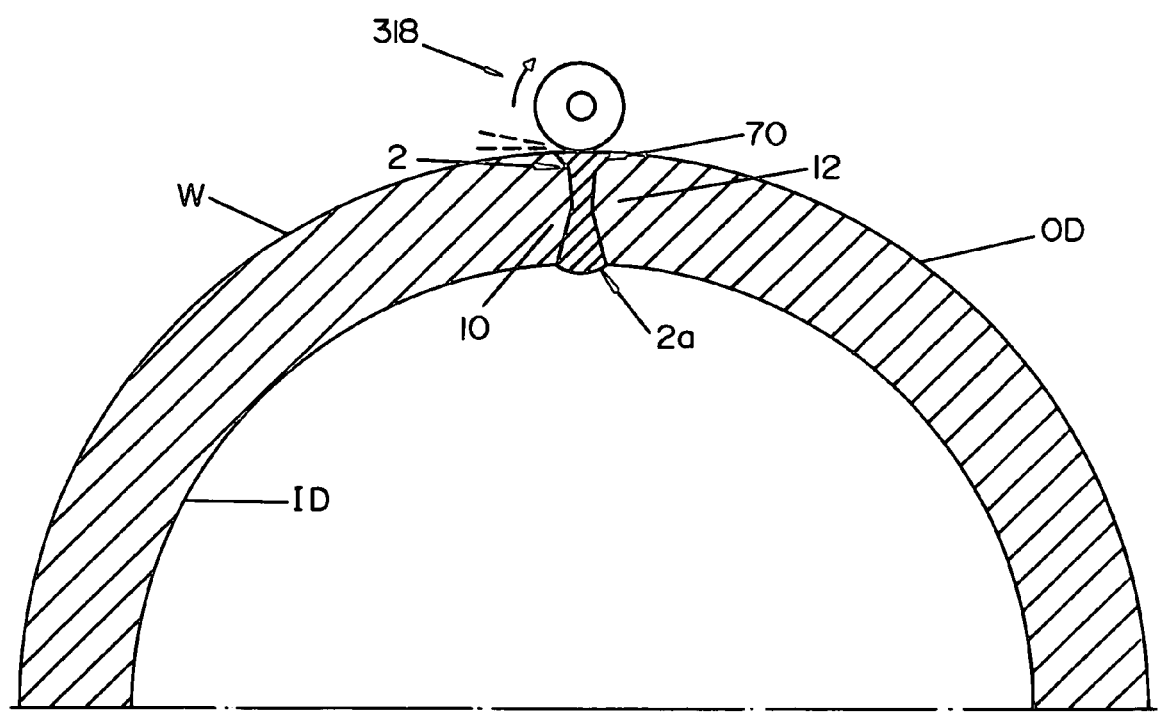
FIG. 9 is a simplified end elevation view in section showing an optional grinding step in the method of FIG. 4.

Referring also to FIGS. 4 and 7, after the tack weld is completed at 312, an inner groove weld operation 314 is performed, which can be any suitable welding process that provides additional weld material to the inner groove 2*a*. In one example, a metal inert gas (MIG) weld process 314 is used, although submerged arc tandem welding techniques may also be employed. As shown in FIG. 7, the inner groove weld 314 may provide significant arc penetration thereby melting portions of the pipe W and essentially filling the inner groove 2*a*. At 316, a final outer groove weld operation is performed, as shown in FIG. 8, which can be any suitable process 316 (e.g., MIG or other weld operation) that provides weld material in the outer groove 2. In the illustrated example, the final outer groove weld 316 totally consumes (e.g., remelts) the initial tack weld 70 and essentially fills the outer groove 2 along the longitudinal pipe seam. Thereafter, the pipe welding process 300 may be completed at 320, or an optional outer seam grind or other finishing operation may be performed at 318 to remove any excess material from the outer groove weld, as shown in FIG. 8, before the method 300 ends at 320.

While the invention has been illustrated and described hereinabove with respect to one or more exemplary implementations, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A modified series arc welder for depositing weld metal along a groove proximate two edges of a metal workpiece using a plurality of welding cycles having a short-circuit condition and an arc condition, said welder comprising: first and second wire feeders respectively adapted to direct first and second electrodes toward a point proximate said workpiece; a first power source having a first output terminal coupled with said first electrode to provide a first current thereto according to a selected first waveform in a welding cycle; and a second power source having a first output terminal coupled with said second electrode to provide a second current thereto according to a selected second waveform in said welding cycle; said power sources and said electrodes being coupled in a series circuit to provide electrical power to said electrodes as a plurality of said welding cycles for depositing molten metal in the form of a pool along said groove during a welding operation, each of said welding cycles including an arc condition during which said first electrode is spaced from said pool and energy applied to said first electrode causes a first molten metal to form on an end of said first electrode and a short-circuit condition during which said first molten metal on said end of said first electrode contacts said pool and then transfers from said first electrode to said pool by a necking action; wherein said first power source provides said first current having a first polarity during said arc condition and at least a portion of said short-circuit condition, and provides said first current having a second opposite polarity during a reverse boost portion of said welding cycle according to said first waveform to transfer molten metal from said second electrode to said first electrode prior to a short-circuit condition of a subsequent welding cycle.

2. A modified series arc welder as defined in claim 1, wherein current flows from said first output terminal of said first power source to said first electrode when said first current has said first polarity, and wherein current flows from said first electrode to said first output terminal of said first power source when said first current has said second opposite polarity.

3. A modified series arc welder as defined in claim 2, wherein said second power source provides said second current having a first polarity during said arc condition and at least a portion of said short-circuit condition, and provides said second current having a second opposite polarity during said reverse boost portion of said welding cycle according to said second waveform to transfer said molten metal from said second electrode to said first electrode prior to a short-circuit condition of a subsequent welding cycle.

4. A modified series arc welder as defined in claim 3, wherein current flows from said second electrode to said first output terminal of said second power source when said second current has said first polarity, and wherein current flows from said first output terminal of said second power source to said second electrode when said second current has said second polarity.

5. A modified series arc welder as defined in claim 1, wherein said second power source provides said second current having a first polarity during said arc condition and at least a portion of said short-circuit condition, and provides said second current having a second opposite polarity during said reverse boost portion of said welding cycle according to said second waveform to transfer said molten metal from said second electrode to said first electrode prior to a short-circuit condition of a subsequent welding cycle, wherein current flows from said second electrode to said first output terminal of said second power source when said second current has said first polarity, and wherein current flows from said first output terminal of said second power source to said second electrode when said second current has said second polarity.

6. A modified series arc welder as defined in claim 1, wherein said first power source comprises a second output terminal coupled with at least one of said second power source and said workpiece; and a high speed switching output stage coupled with said first and second output terminals for creating said first current according to said selected first waveform, said first waveform being generated by a waveform generator controlling a pulse width modulator circuit to determine the current operation of said output stage.

7. A modified series arc welder as defined in claim 6, wherein said first power source further comprises a short-circuit detection circuit coupled with at least one of said first and second output terminals of said first power source, said short-circuit detection circuit detecting a beginning of said short-circuit condition and providing a short-circuit signal to said waveform generator in response to said beginning of said short-circuit condition.

8. A modified series arc welder as defined in claim 7, wherein said short-circuit detection circuit comprises a first comparator receiving a first current signal indicative of said first current and a first reference signal, said first comparator providing said short-circuit signal when said first current signal is greater than said first reference signal.

9. A modified series arc welder as defined in claim 8, wherein said first power source further comprises a premonition circuit coupled with at least one of said first and second output terminals of said first power source, said premonition circuit detecting an imminent fuse condition in which said first molten metal separates from said first electrode, and said premonition circuit providing a premonition signal to said waveform generator in response to said imminent fuse condition.

10. A modified series arc welder as defined in claim 9, wherein said premonition circuit comprises a dv/dt circuit receiving a signal indicative of a first voltage between said first and second output terminals of said first power source and providing a dv/dt signal indicative of a rate of change of said first voltage, and a second comparator receiving said dv/dt signal from said dv/dt circuit and a second reference signal, said second comparator providing said premonition signal when said dv/dt signal is greater than said second reference signal.

11. A welder as defined in claim 10, wherein current flows from said first output terminal of said first power source to said first electrode when said first current has said first polarity, and wherein current flows from said first electrode to said first output terminal of said first power source when said first current has said second opposite polarity.

12. A modified series arc welder as defined in claim 10, wherein said second power source provides said second current having a first polarity during said arc condition and at least a portion of said short-circuit condition, and provides said second current having a second opposite polarity during said reverse boost portion of said welding cycle according to said second waveform to transfer said molten metal from said second electrode to said first electrode prior to a short-circuit condition of a subsequent welding cycle, wherein current flows from said second electrode to said first output terminal of said second power source when said second current has said first polarity, and wherein current flows from said first output terminal of said second power source to said second electrode when said second current has said second polarity.

13. A modified series arc welder as defined in claim 6, wherein said first power source further comprises a premonition circuit coupled with at least one of said first and second output terminals of said first power source, said premonition circuit detecting an imminent fuse condition in which said first molten metal separates from said first electrode and said premonition circuit providing a premonition signal to said waveform generator in response to said imminent fuse condition, wherein said premonition circuit comprises a dv/dt circuit receiving a signal indicative of a first voltage between said first and second output terminals of said first power source and providing a dv/dt signal indicative of a rate of change of said first voltage, and a second comparator receiving said dv/dt signal from said dv/dt circuit and a second reference signal, said second comparator providing said premonition signal when said dv/dt signal is greater than said second reference signal.

14. A modified series arc welder as defined in claim 13, wherein current flows from said first output terminal of said first power source to said first electrode when said first current has said first polarity, and wherein current flows from said first electrode to said first output terminal of said first power source when said first current has said second opposite polarity.

15. A modified series arc welder as defined in claim 13, wherein said second power source provides said second current having a first polarity during said arc condition and at least a portion of said short-circuit condition, and provides said second current having a second opposite polarity during said reverse boost portion of said welding cycle according to said second waveform to transfer said molten metal from said second electrode to said first electrode prior to a short-circuit condition of a subsequent welding cycle, wherein current flows from said second electrode to said first output terminal of said second power source when said second current has said first polarity, and wherein current flows from said first output terminal of said second power source to said second electrode when said second current has said second polarity.

16. A modified series arc welder as defined in claim 6, wherein said second power source comprises a second output terminal coupled with at least one of said first power source and said workpiece; and a high speed switching output stage coupled with said first and second output terminals of said second power source for creating said second current according to said selected second waveform, said second waveform being generated by a waveform generator in said second power source controlling a pulse width modulator circuit to determine the current operation of said output stage of said second power source.

17. A modified series arc welder as defined in claim 16, wherein current flows from said first output terminal of said first power source to said first electrode when said first current has said first polarity, and wherein current flows from said first electrode to said first output terminal of said first power source when said first current has said second opposite polarity.

18. A modified series arc welder as defined in claim 16, wherein said second power source provides said second current having a first polarity during said arc condition and at least a portion of said short-circuit condition, and provides said second current having a second opposite polarity during said reverse boost portion of said welding cycle according to said second waveform to transfer said molten metal from said second electrode to said first electrode prior to a short-circuit condition of a subsequent welding cycle, wherein current flows from said second electrode to said first output terminal of said second power source when said second current has said first polarity, and wherein current flows from said first output terminal of said second power source to said second electrode when said second current has said second polarity.

19. A modified series arc welder as defined in claim 1, wherein said first power source comprises a second output terminal coupled with said first terminal of said second power source, wherein said second power source comprises a second output terminal coupled with said workpiece, wherein return currents associated with said first and second power sources flow through said workpiece, and wherein current flowing through said pool of molten metal during said arc and short-circuit conditions is about equal to a sum of said first and second currents.

20. A modified series arc welder as defined in claim 1, wherein said second current at least partially causes formation of a second arc between said second electrode and said first electrode.

21. A welder as defined in claim 20, wherein current of said second arc flows from said first electrode to said second electrode during said arc condition and said portion of said short-circuit condition, and wherein said current of said second arc flows from said second electrode to said first electrode during said reverse boost portion of said welding cycle.

22. A method of short-circuit arc welding a workpiece, the method comprising:
(a) directing first and second electrodes toward a point proximate a workpiece;
(b) providing first and second currents to said first and second electrodes according to selected first and second waveforms, respectively, to deposit molten metal from at least one of said electrodes onto said workpiece in a sequence of welding cycles, each of said welding cycles including an arc condition during which said first electrode is spaced from said workpiece and energy applied to said first electrode causes a first molten metal to form on an end of said first electrode and a short-circuit condition during which said first molten metal on said end of said first electrode contacts said workpiece and then transfers from said first electrode to said workpiece; and
(c) selectively reversing an electrical polarity of said first current during said welding cycle such that said first current has a first polarity during said arc condition and at least a portion of said short-circuit condition, and a second opposite polarity during a reverse boost portion of said welding cycle according to said first waveform to transfer molten metal from said second electrode to said first electrode prior to a short-circuit condition of a subsequent welding cycle.

23. A method as defined in claim 22, wherein current flows from said first electrode to said workpiece when said first current has said first polarity, and wherein current flows from said workpiece to said first electrode when said first current has said second opposite polarity.

24. A method as defined in claim 23, further comprising:
(d) selectively reversing an electrical polarity of said second current during said welding cycle such that said second current has a first polarity during said arc condition and at least a portion of said short-circuit condition, and a second opposite polarity during a reverse boost portion of said welding cycle according to said second waveform prior to a short-circuit condition of a subsequent welding cycle.

25. A method as defined in claim 24, wherein current flows from said first electrode to said second electrode when said second current has said first polarity, and wherein current flows from said second electrode to said first electrode when said second current has said second polarity.

26. A method as defined in claim 22, further comprising:
(d) selectively reversing an electrical polarity of said second current during said welding cycle such that said second current has a first polarity during said arc condition and at least a portion of said short-circuit condition, and a second opposite polarity during a reverse boost portion of said welding cycle according to said second waveform prior to a short-circuit condition of a subsequent welding cycle.

27. A method as defined in claim 26, wherein current flows from said first electrode to said second electrode when said second current has said first polarity, and wherein current flows from said second electrode to said first electrode when said second current has said second polarity.

28. A method for welding a pipe seam, the method comprising: engaging two pipe seam edges to one another to form a cylindrical pipe structure having an inside and an outside, said cylindrical pipe structure having a seam at the two engaged seam edges with an outer groove and an inner groove; welding a portion of the outer groove using a series welding process to tack the two seam edges together, said series welding process comprising a plurality of welding cycles individually having a short-circuit condition and an arc condition; welding the inner groove after the two seam edges have been tacked together to essentially fill the inner groove and form an inner seam; and welding the outer groove after welding the inner groove to essentially fill the outer groove and form an outer seam; wherein each of said welding cycles includes an arc condition during which a first electrode is spaced from said workpiece and energy applied to said first electrode causes a first molten metal to form on an end of said first electrode and a short-circuit condition during which said first molten metal contacts said workpiece and then transfers from said first electrode to said workpiece by a necking action; wherein said high current series welding process comprises providing first and second currents to said first and second electrodes to deposit molten metal from at least one of said electrodes onto said workpiece in a sequence of welding cycles, and wherein welding a portion of the outer groove using a series welding process comprises selectively reversing an electrical polarity of said first current during said welding cycle such that said first current has a first polarity during said arc condition and at least a portion of said short-circuit condition, and a second opposite polarity during a reverse boost portion of said welding cycle to transfer molten metal from said second electrode to said first electrode prior to a short-circuit condition of a subsequent welding cycle.

29. A method as defined in claim 28, further comprising grinding the outer seam.

30. A method as defined in claim 28, wherein said series welding process comprises providing first and second currents to said first and second electrodes to deposit molten metal from at least one of said electrodes onto said workpiece in a sequence of welding cycles, and wherein welding a portion of the outer groove using a high current series welding process comprises selectively reversing an electrical polarity of one of said currents during said welding cycles.

31. A modified series arc welder for depositing weld metal along a groove proximate a pipe seam using a plurality of welding cycles individually having a short-circuit condition and an arc condition, said welder comprising: first and second wire feeders respectively adapted to direct first and second electrodes toward a point proximate said workpiece; a first power source providing a first current to said first electrode; a second power source providing a second current to said second electrode, said power sources and said electrodes being connected in a series circuit; a short-circuit detection; and wherein said first power source provides said first current having a first polarity during said arc condition and at least a portion of said short-circuit condition, and provides said first current having a second opposite polarity during a reverse boost portion of said welding cycle to transfer molten metal from said second electrode to said first electrode prior to a short- circuit condition of a subsequent welding cycle.

32. A modified series arc welder as defined in claim 31, wherein said at least one of said power sources is adapted to selectively reverse an electrical polarity of one of said currents during said welding cycles.

33. A modified series arc welder as defined in claim 31, wherein said short-circuit detection circuit comprises a first comparator receiving a first current signal indicative of said first current and a first reference signal, said first comparator providing said short-circuit signal when said first current signal is greater than said first reference signal.

34. A modified series arc welder as defined in claim 31, wherein said premonition circuit comprises a dv/dt circuit receiving a signal indicative of a first voltage and providing a dv/dt signal indicative of a rate of change of said first voltage, and a second comparator receiving said dv/dt signal from said dv/dt circuit and a second reference signal, said second comparator providing said premonition signal when said dv/dt signal is greater than said second reference signal.

35. An arc welding system, comprising: a wire feeding system adapted to direct first and second electrodes toward a workpiece, said first and second electrodes being connected in a series circuit; and a source of electrical power providing a first current to said first electrode and a second current to said second electrode to deposit material from said first and second electrodes in a short-circuit arc welding process having an arc condition and a short-circuit condition in each of a plurality of welding cycles; and wherein said source of electrical power provides said first current having a first polarity during said arc condition and at least a portion of said short-circuit condition, and provides said first current having a second opposite polarity during a reverse boost portion of said welding cycle to transfer material from said second electrode to said first electrode prior to a short-circuit condition of a subsequent welding cycle.

36. An arc welding system as defined in claim 35, wherein said wire feeding system comprises a first wire feeder adapted to direct said first electrode toward said workpiece and a second feeder adapted to direct said second electrode toward said workpiece.

37. An arc welding system as defined in claim 36, wherein said source of electrical power comprises a first power source providing said first current to said first electrode and a second power source providing said second current to said second electrode.

38. An arc welding system as defined in claim 37, wherein said source of electrical power provides said first and second currents such that a first arc is established between said first electrode and said workpiece and a second arc is established between said first and second electrodes during said arc condition of said welding cycles.

39. An arc welding system as defined in claim 38, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

40. An arc welding system as defined in claim 37, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

41. An arc welding system as defined in claim 36, wherein said source of electrical power provides said first and second currents such that a first arc is established between said first electrode and said workpiece and a second arc is established between said first and second electrodes during said arc condition of said welding cycles.

42. An arc welding system as defined in claim 41, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

43. An arc welding system as defined in claim 36, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

44. An arc welding system as defined in claim 35, wherein said source of electrical power comprises a first power source providing said first current to said first electrode and a second power source providing said second current to said second electrode.

45. An arc welding system as defined in claim 44, wherein said source of electrical power provides said first and second currents such that a first arc is established between said first electrode and said workpiece and a second arc is established between said first and second electrodes during said arc condition of said welding cycles.

46. An arc welding system as defined in claim 45, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

47. An arc welding system as defined in claim 44, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

48. An arc welding system as defined in claim 35, wherein said source of electrical power provides said first and second currents such that a first arc is established between said first electrode and said workpiece and a second arc is established between said first and second electrodes during said arc condition of said welding cycles.

49. An arc welding system as defined in claim 48, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

50. An arc welding system as defined in claim 35, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

51. An arc welding system, comprising: a wire feeding system adapted to direct first and second electrodes toward a workpiece; and a source of electrical power energizing said electrodes to deposit material from said electrodes in a short-circuit arc welding process having an arc condition and a short-circuit condition in each of a plurality of welding cycles, said source of electrical power providing a first current to said first electrode and a second current to said second electrode to establish a first arc between said first electrode and said workpiece and a second arc between said first and second electrodes; and wherein said source of electrical power provides said first current having a first polarity during said arc condition and at least a portion of said short-circuit condition, and provides said first current having a second opposite polarity during a reverse boost portion of said welding cycle to transfer material from said second electrode to said first electrode prior to a short-circuit condition of a subsequent welding cycle.

52. An arc welding system as defined in claim 51, wherein said wire feeding system comprises a first wire feeder adapted to direct said first electrode toward said workpiece and a second feeder adapted to direct said second electrode toward said workpiece.

53. An arc welding system as defined in claim 52, wherein said source of electrical power comprises a first power source providing said first current to said first electrode and a second power source providing said second current to said second electrode.

54. An arc welding system as defined in claim 53, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

55. An arc welding system as defined in claim 51, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

56. An arc welding system as defined in claim 51, wherein said source of electrical power comprises a first power source providing said first current to said first electrode and a second power source providing said second current to said second electrode.

57. An arc welding system as defined in claim 56, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

58. An arc welding system as defined in claim 51, further comprising a short-circuit detection circuit adapted to detect a beginning of said short-circuit condition and a premonition circuit adapted to detect an imminent metal breaking fuse condition at an end of said short-circuit condition, wherein said source of electrical power provides said first and second currents according to said detected beginning of said short-circuit condition, and according to said detected imminent metal breaking fuse condition, and wherein said source of electrical power provides a power boost to said first electrode during the arc condition to form molten metal on said first electrode.

59. A method for welding a workpiece, said method comprising: (a) directing first and second electrodes toward a point; and (b) providing first and second currents to said first and second electrodes, respectively, to establish a first arc between said first electrode and a workpiece and a second arc between said first and second electrodes in order to transfer material from said electrodes to said workpiece in a plurality of welding cycles, each welding cycle including an arc condition and a short-circuit condition; selectively reversing an electrical polarity of said first current during said welding cycle such that said first current has a first polarity during said arc condition and at least a portion of said short-circuit condition, and a second opposite polarity during a reverse boost portion of said welding cycle; and transferring material from said second electrode to said first electrode by reversing a polarity of at least one of said currents during said arc condition prior to a short-circuit condition of a subsequent welding cycle.

60. A method as defined in claim 59, further comprising: detecting a beginning of said short-circuit condition; detecting an imminent metal breaking fuse condition at an end of said short-circuit condition, and controlling said first and second currents according to said detected beginning of said short-circuit condition and said detected imminent metal breaking fuse condition.

61. A method as defined in claim 60, further comprising providing a power boost to said first electrode during said arc condition to form molten metal on said first electrode.

62. A method as defined in claim 59, further comprising providing a power boost to said first electrode during said arc condition to form molten metal on said first electrode.

* * * * *

UNITED STATES PATENT AND TRADEMARK OFFICE
CERTIFICATE OF CORRECTION

PATENT NO. : 7,495,193 B2 Page 1 of 1
APPLICATION NO. : 11/081059
DATED : February 24, 2009
INVENTOR(S) : Russ K. Myers, Timothy M. O'Donnell and Timothy P. Rosiek It is certified that error appears in the above-identified patent and that said Letters Patent is hereby corrected as shown below:

In column 25, claim 55: line 57;

Replace "An arc welding system as defined in claim 51"

with --An arc welding system as defined in claim 52--

Signed and Sealed this

Nineteenth Day of May, 2009

JOHN DOLL
*Acting Director of the United States Patent and Trademark Office*